(12) United States Patent
Klein et al.

(10) Patent No.: US 9,597,969 B2
(45) Date of Patent: Mar. 21, 2017

(54) SYSTEMS AND METHODS FOR PROVIDING IN-ROAD ELECTRIC CONDUCTIVITY BOXES AND ON-VEHICLE DESCENT AND PIVOT CONTACTS FOR VEHICLES

(71) Applicant: Amres Network Coalition, LLC, Lake Wylie, SC (US)

(72) Inventors: Patrick Klein, Foster City, CA (US); Steven Roe, San Mateo, CA (US); Matthew L. Kaplan, Brooklyn, NY (US); Thomas Dwight, Redwood City, CA (US)

(73) Assignee: AMRES NETWORK COALITION, LLC, Lake Wylie, SC (US)

( * ) Notice: Subject to any disclaimer, the term of this patent is extended or adjusted under 35 U.S.C. 154(b) by 297 days.

(21) Appl. No.: 14/453,069

(22) Filed: Aug. 6, 2014

(65) Prior Publication Data

US 2015/0041273 A1  Feb. 12, 2015

Related U.S. Application Data

(60) Provisional application No. 61/862,573, filed on Aug. 6, 2013, provisional application No. 61/887,050, filed on Oct. 4, 2013.

(51) Int. Cl.
| | |
|---|---|
| *B60L 11/00* | (2006.01) |
| *B60L 11/18* | (2006.01) |
| *B60L 5/40* | (2006.01) |
| *B60M 1/34* | (2006.01) |

(52) U.S. Cl.
CPC ............ *B60L 11/1816* (2013.01); *B60L 5/40* (2013.01); *B60L 11/1837* (2013.01); *B60M 1/34* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
CPC .... B60L 11/1816; B60L 11/1837; B60L 5/40; B60M 1/34
See application file for complete search history.

(56) References Cited

U.S. PATENT DOCUMENTS

| | | | | |
|---|---|---|---|---|
| 2,836,129 | A * | 5/1958 | Jaeger | A63H 18/12 104/120 |
| 4,969,400 | A * | 11/1990 | Burg | E01B 25/28 104/247 |
| 5,960,717 | A * | 10/1999 | Andre | B60L 5/40 104/139 |
| 7,600,621 | B2 * | 10/2009 | Lohr | B60L 5/40 104/140 |

(Continued)

*Primary Examiner* — Jason C Smith
(74) *Attorney, Agent, or Firm* — Van Court & Aldridge LLP

(57) ABSTRACT

Systems and methods for providing in-road electric conductivity boxes and on-vehicle descent and pivot contacts for vehicles are provided. In one example embodiment, a system includes, inter alia, a charging component physically coupled to a roadway, a power source electrically coupled to the charging component, and a vehicle that electrically couples with the charging component for receiving power from the power source via the charging component when the vehicle is on the roadway at a location proximate to the charging component. Additional embodiments are also provided.

4 Claims, 14 Drawing Sheets

(56) References Cited

U.S. PATENT DOCUMENTS

| | | | | |
|---|---|---|---|---|
| 7,986,125 | B2* | 7/2011 | Mitake | B60L 5/42 |
| | | | | 191/29 R |
| 8,141,496 | B2* | 3/2012 | Andre | B61F 9/00 |
| | | | | 104/244 |
| 8,430,333 | B2* | 4/2013 | Andre | E01B 25/28 |
| | | | | 105/72.2 |
| 9,038,796 | B2* | 5/2015 | Woronowicz | B60L 5/005 |
| | | | | 191/22 C |
| 2011/0153184 | A1* | 6/2011 | Suh | B60L 5/40 |
| | | | | 701/117 |
| 2011/0266108 | A1* | 11/2011 | Kitaguchi | B60L 5/42 |
| | | | | 191/22 C |
| 2011/0266109 | A1* | 11/2011 | Meins | B60L 5/005 |
| | | | | 191/29 R |
| 2013/0020164 | A1* | 1/2013 | Asplund | B60L 5/40 |
| | | | | 191/29 R |
| 2013/0020165 | A1* | 1/2013 | Asplund | B60L 5/40 |
| | | | | 191/29 R |
| 2013/0126287 | A1* | 5/2013 | Kanemori | E01B 25/28 |
| | | | | 191/29 R |
| 2015/0041273 | A1* | 2/2015 | Klein | B60L 11/1816 |
| | | | | 191/22 C |
| 2016/0207409 | A1* | 7/2016 | Ueo | B60L 11/1838 |
| | | | | 320/109 |

* cited by examiner

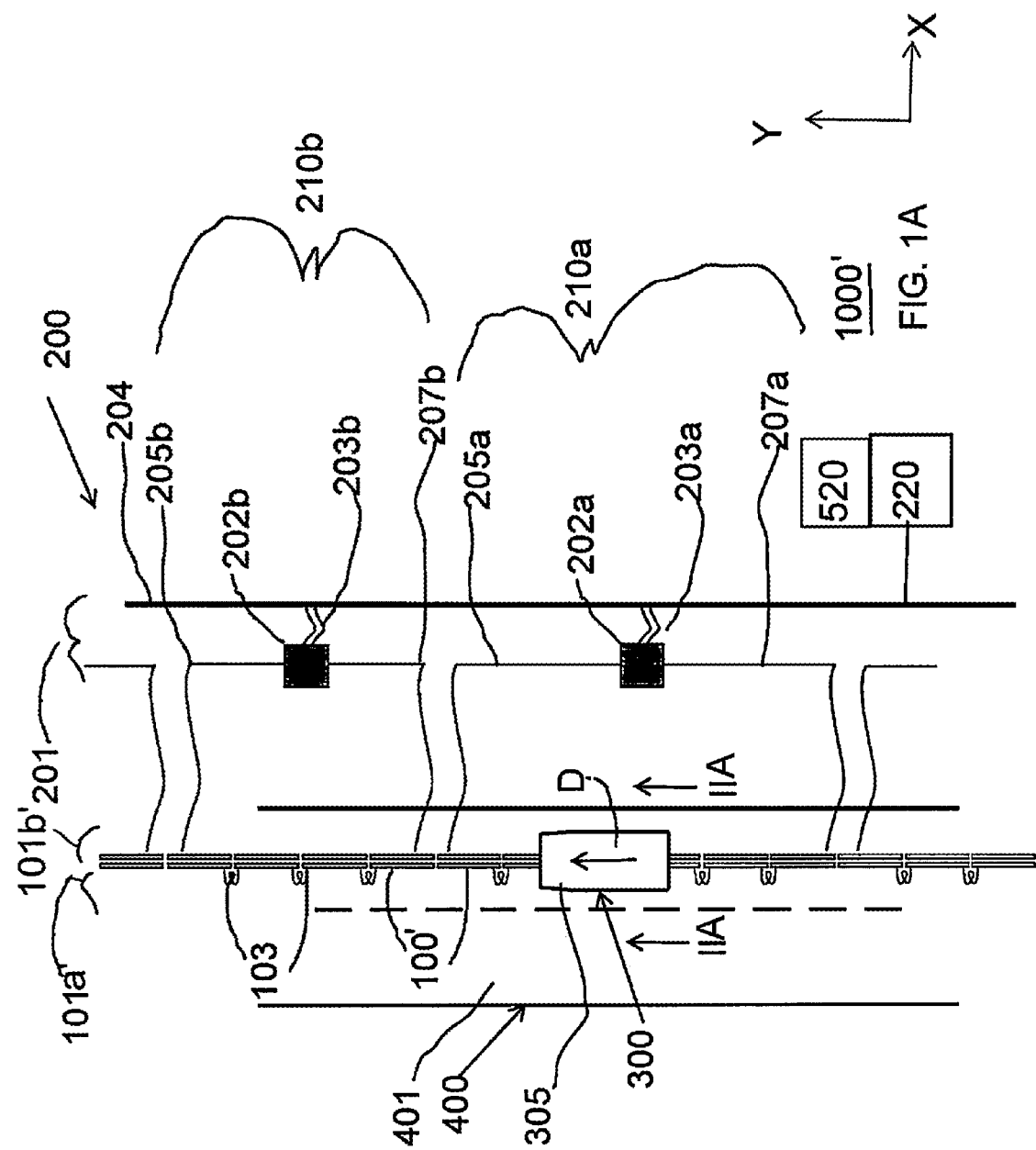

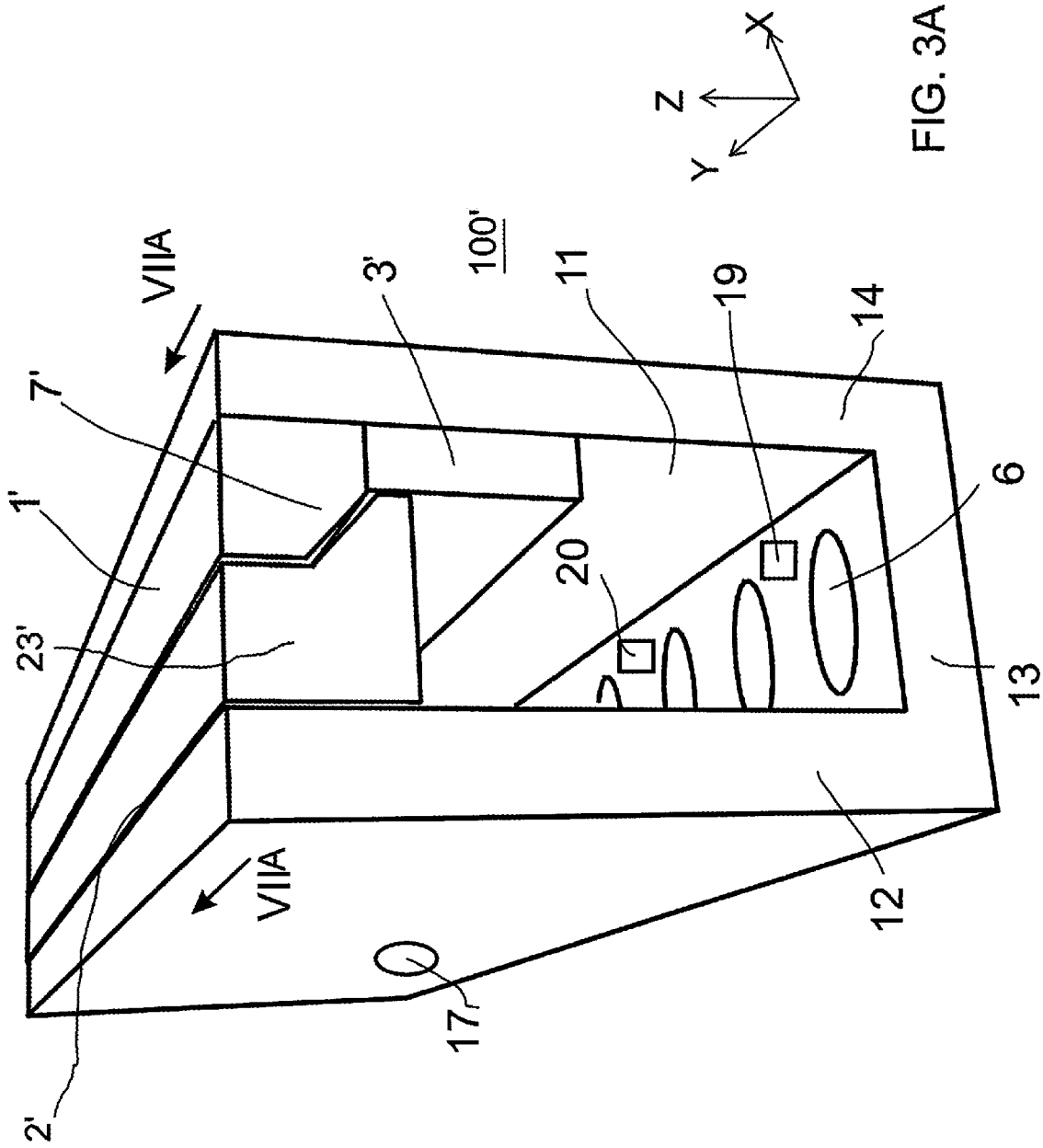

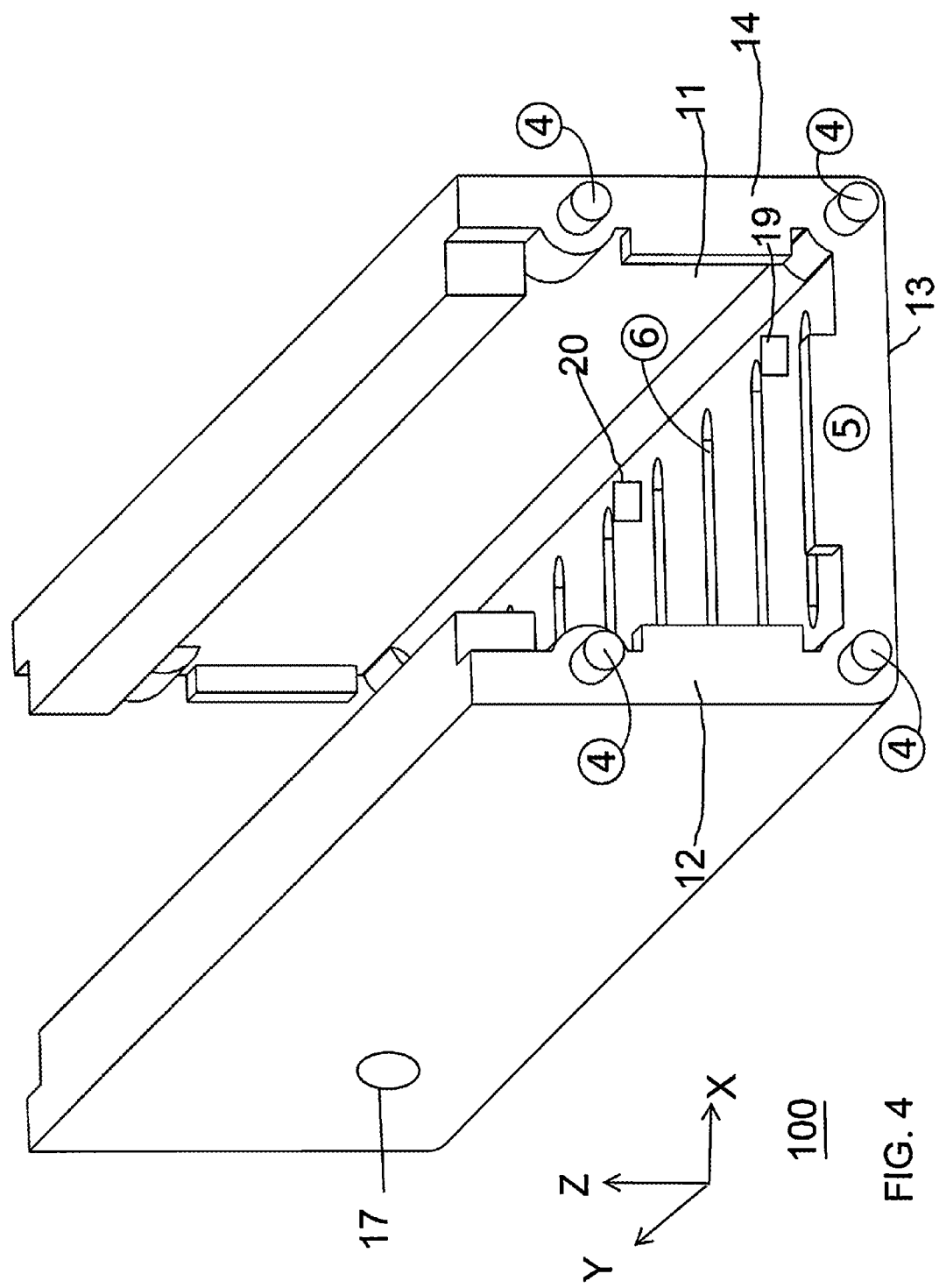

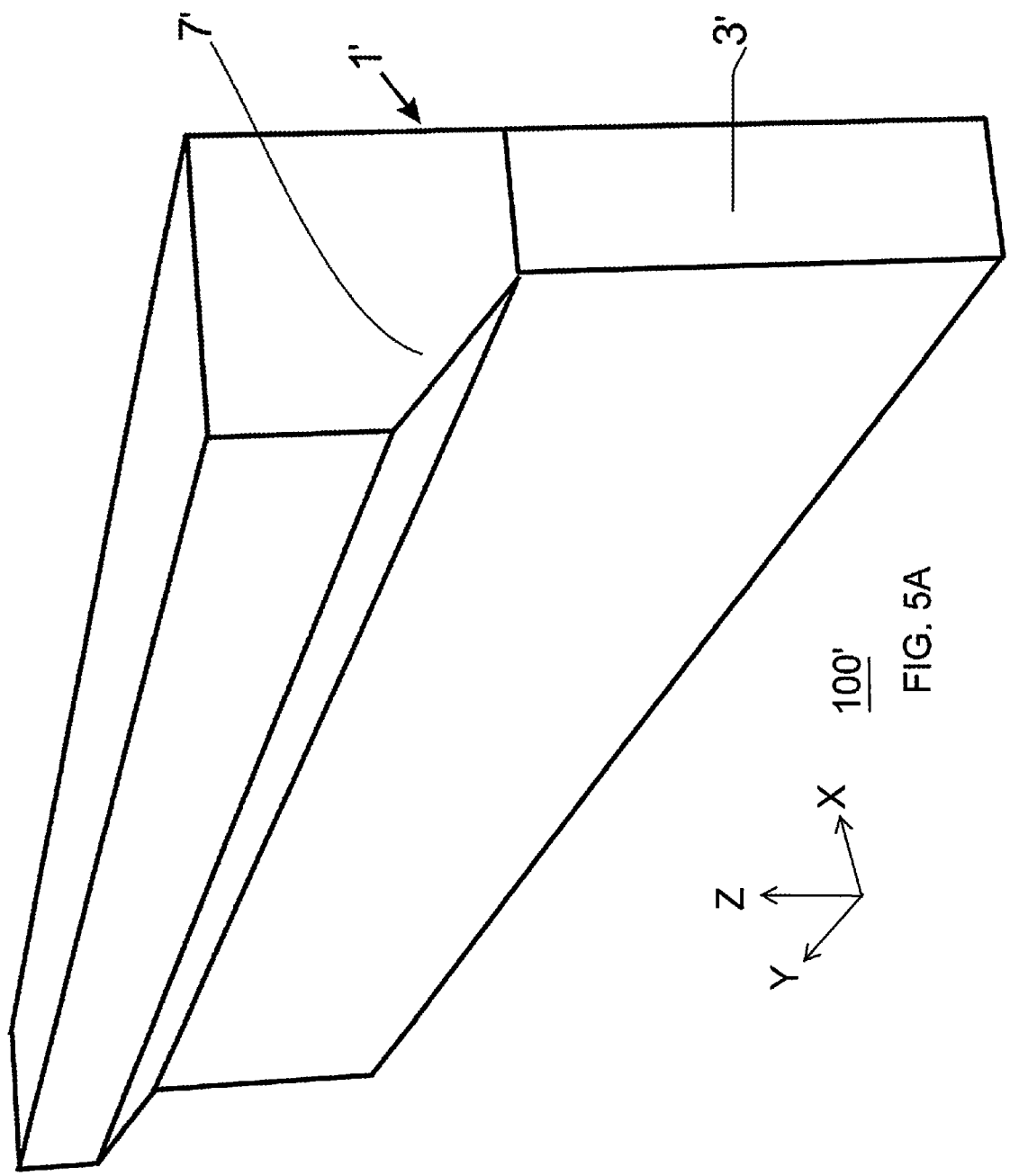

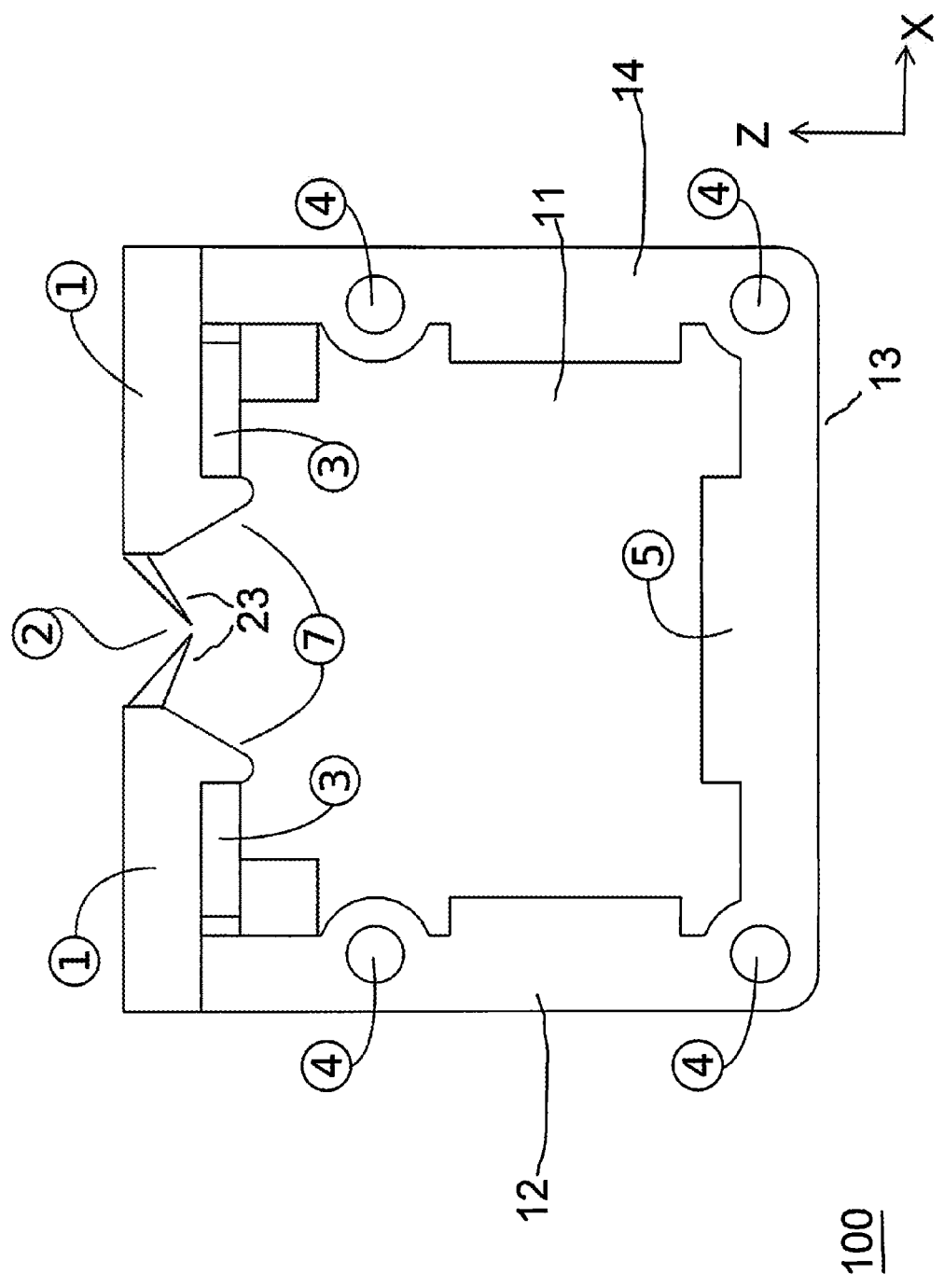

SYSTEMS AND METHODS FOR PROVIDING IN-ROAD ELECTRIC CONDUCTIVITY BOXES AND ON-VEHICLE DESCENT AND PIVOT CONTACTS FOR VEHICLES

CROSS-REFERENCE TO RELATED APPLICATION

This application claims the benefit of prior filed U.S. Provisional Patent Application No. 61/862,573, filed Aug. 6, 2013, and of prior filed U.S. Provisional Patent Application No. 61/887,050, filed Oct. 4, 2013, each of which is hereby incorporated by reference herein in its entirety.

TECHNICAL FIELD

This disclosure relates to in-road electric conductivity boxes and on-vehicle descent and pivot contacts for vehicles.

BACKGROUND OF THE DISCLOSURE

Most personal and commercial vehicles currently operate by burning fossil fuels or by an electric motor powered by an on-vehicle battery. The use of fossil fuels has negative repercussions for the environment, domestic financial health, and national security. Battery-powered electric vehicles require a cost inefficient on-vehicle battery and long charging times prior to use of the vehicle on the roadways.

SUMMARY OF THE DISCLOSURE

This document describes systems and methods for providing in-road electric conductivity boxes and on-vehicle descent and pivot contacts for vehicles.

As an example, a system may include a charging component physically coupled to a roadway, a power source electrically coupled to the charging component, and a vehicle that electrically couples with the charging component for receiving power from the power source via the charging component when the vehicle is on the roadway at a location proximate to the charging component.

As another example, a vehicle for use with a system component physically connected to a road at a first location may include a main body including a bottom surface, at least one wheel coupled to the main body for moving the vehicle along the road, an electronic vehicle component at least partially positioned within the main body, and a probe electrically coupled to the electronic vehicle component, wherein the probe electrically couples the electronic vehicle component to the system component when the vehicle moves along the road proximate the first location.

As yet another example, a method may include receiving power from a power source at a charging component that is physically coupled to a roadway, temporarily electrically coupling the charging component to a vehicle moving along the roadway when the vehicle is proximate to the charging component, and, during the electrically coupling, providing the received power from the charging component to the vehicle.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1A is a top view of another illustrative in-road electric conductivity system, in accordance with some embodiments;

FIG. 3A is a perspective view of an illustrative in-road electric conductivity box of the system of FIGS. 1A and 2A, in accordance with some embodiments;

FIG. 4 is a perspective view of the illustrative in-road electric conductivity box of FIGS. 1, 2, and 3, but with the two top portions removed, in accordance with some embodiments;

FIG. 5A is a perspective view of a top portion of the illustrative in-road electric conductivity box of FIGS. 1A, 2A, and 3A, in accordance with some embodiments;

FIG. 8 is a cross-sectional side view of another illustrative in-road electric conductivity box, in accordance with some embodiments.

DETAILED DESCRIPTION OF THE DISCLOSURE

Systems and methods are disclosed for providing in-road electric conductivity boxes that may safely avail electricity from the roadbed to any suitable overpassing transports, such as automobiles, light trucks, buses, heavy trucks, and/or goods transport vehicles. In some embodiments, electricity may constantly be provided to such boxes, whereby the system may not require both an in-road supply line and a series of in-road circuits for repeatedly switching on and off the supply of electricity. Rather, the system may provide electricity to moving vehicles via a line or lines (e.g., two parallel lines, with modest deviations from parallel that may be applied to account for existing road lane conditions as needed, which may respectively provide positive and negative signals in different isolated boxes) that can be, except for emergencies, outages, or optimizations, always on. Such in-road electric conductivity boxes may reduce transportation costs, vehicle costs, and environmental damage while simultaneously increasing national security, domestic financial health, and vehicle safety.

Systems and methods are also disclosed for providing on-vehicle descent and pivot contacts for automobiles, light trucks, buses, heavy trucks, and/or goods transport vehicles that may be configured to electrically couple to one or more in-road electric conductivity boxes for communicating power to the vehicle as the vehicle passes over the in-road electric conductivity box(es) during use of the vehicle on the roadways.

Systems and methods for providing in-road electric conductivity boxes and on-vehicle descent and pivot contacts for vehicles are provided and described with respect to FIGS. 1-9.

Figure 1:
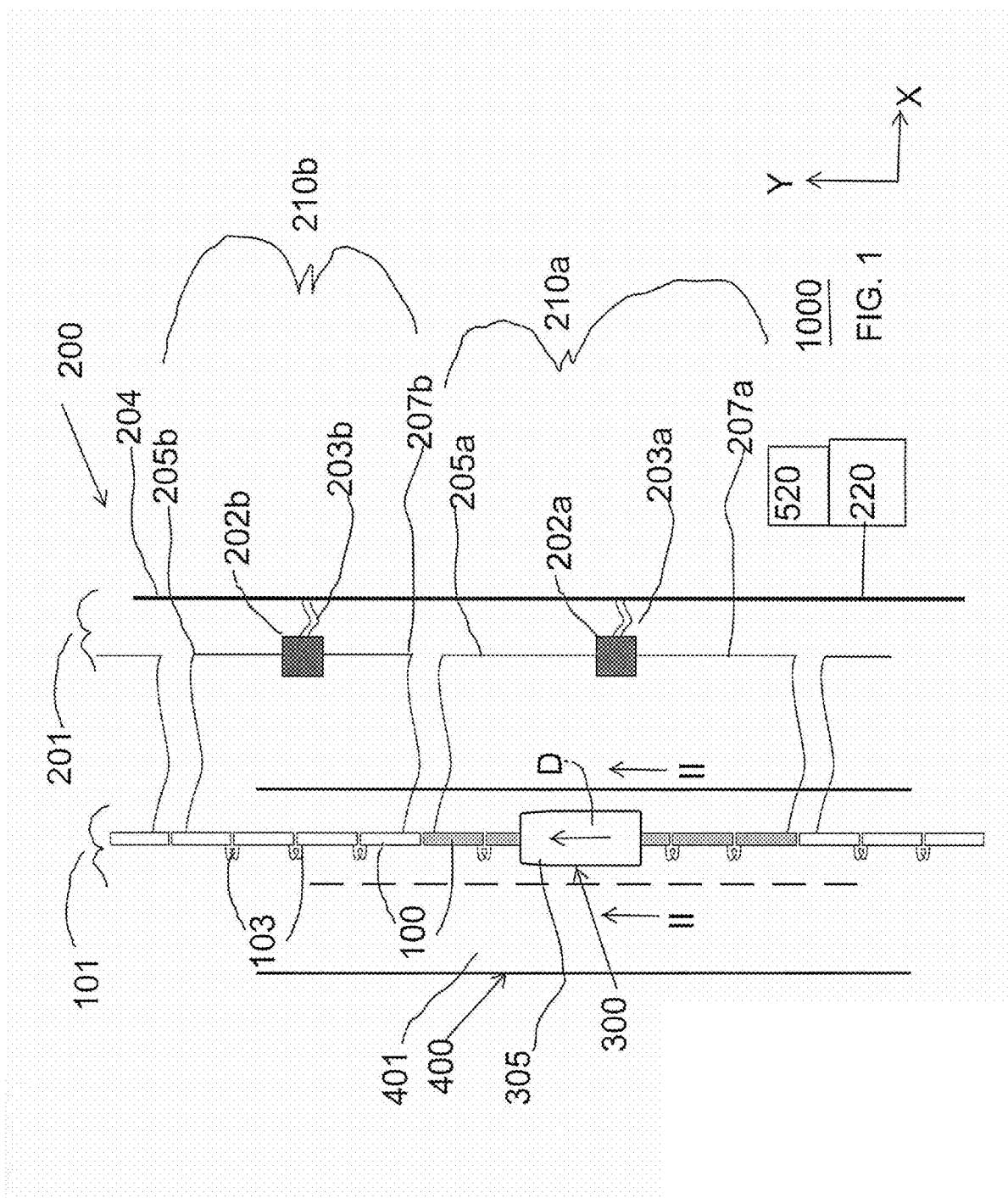
FIG. 1 is a top view of an illustrative in-road electric conductivity system, in accordance with some embodiments.

As shown in FIG. 1, an in-road electric conductivity system 1000 may include a series 101 of in-road electric conductivity boxes 100 that may be provided underneath, adjacent to, on top of, or otherwise along a road 400. Road 400 may be any pathway along which one or more vehicles 300 may travel. Each vehicle 300 may be any suitable vehicle, such as a passenger automobile (e.g., car or van), truck (e.g., heavy truck or light truck or any truck suitable for goods transport), motorcycle, electric bicycle, or any other suitable mode of transportation that may at least partially use electric power (e.g., for propulsion (e.g., in the direction of arrow D along top surface 401 of road 400) and/or for powering certain internal vehicle features, such as lights). Vehicle 300 may include at least two wheels or tires 301 that may rotate to move a main body of vehicle 300 along road 400, where the main body may include at least a top 305 and a bottom 303 that may be suspended above top 401 of road 400 by one or more of tires 301. The main body may at least partially contain one or more users of vehicle 300 and/or any suitable mechanical and/or electrical components configured to properly operate vehicle 300 (e.g., component 320).

System 1000 may also include a power subsystem 200 that may include a series 201 of one or more local power sources 202 (e.g., local power sources 202a and 202b) that may be provided underneath, adjacent to, on top of, or otherwise along road 400. Each in-road electric conductivity box 100 may be electrically coupled to or otherwise configured to receive electric power from at least one local power source 202 of power subsystem 200 (e.g., via one or more local couplings 205 and/or 207 (e.g., couplings 205a/207a of local power source 202a or couplings 205b/207b of local power source 202b). In some embodiments, different local power sources 202 may be electrically coupled to different boxes 100. For example, as shown in FIG. 1, a first set of four (4) boxes 100 may be electrically coupled to each other via electrical couplings 103, and those four (4) boxes 100 may be electrically coupled to local power source 202b via one or both of couplings 205b and 207b of a local power subsystem 210b, whereas another set of four (4) boxes 100 may be electrically coupled to each other via electrical couplings 103, and those four (4) boxes 100 may be electrically coupled to local power source 202a via one or both of couplings 205a and 207a of a local power subsystem 210a. Any suitable number of local power subsystems 210 may be provided along one or more roads 400 and any suitable number of boxes 100 may be electrically coupled to each local power subsystem 210. Each box 100 may be separated any suitable distance from one another that may still enable vehicle 300 to receive adequate power from system 1000 for use while traveling along road 400. Adjacent boxes 100 (e.g., along the direction of road 400, such as along the Y-axis of FIG. 1) may be aligned via locating pins that may extend between adjacent boxes 100. Adjacent boxes 100 may be affixed to each other via clamps or any other suitable attachment mechanisms that may be formed into adjacent ends of adjacent boxes 100. Each local power source 202 may be its own independent source of power to the one or more boxes 100 it may be electrically coupled to. For example, each local power source 202 may be a battery or a solar powered generator or any other suitable source of power that may be provided along road 400. Alternatively or additionally, two or more local power sources 202 (e.g., local power sources 202a and 202b) may be electrically coupled to a common master power source 220 via any suitable master coupling 204, where each local power source 202 may be coupled to the master coupling 204 via its own suitable electrical coupler 203 (e.g., local power source 202a may be electrically coupled to master coupling 204 via coupling 203a, and local power source 202b may be electrically coupled to master coupling 204 via coupling 203b). Master power source 220 may be any suitable power source, such as an electrical grid, a nuclear power plant, or the like.

Figure 2:
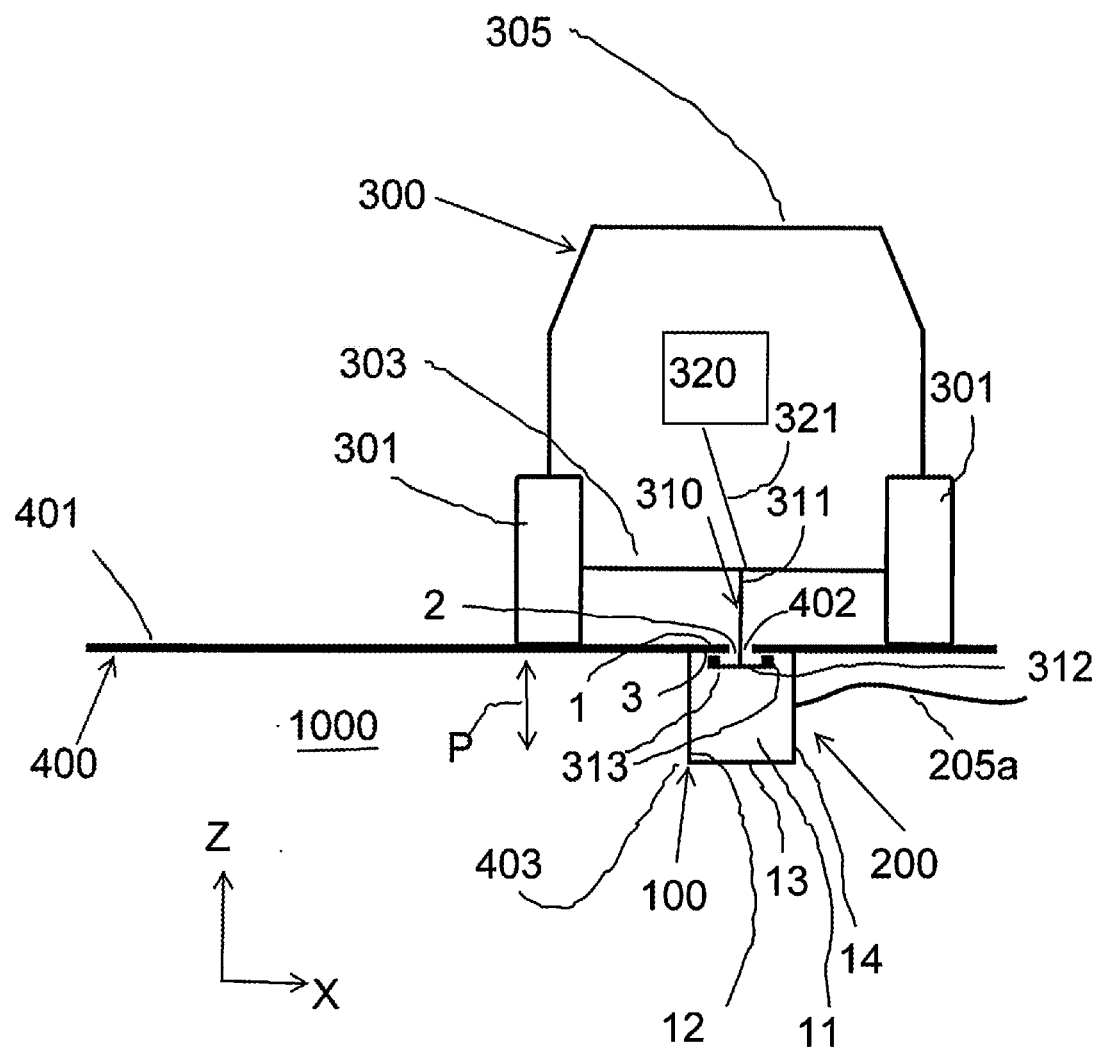
FIG. 2 is a cross-sectional side view of the illustrative in-road electric conductivity system of FIG. 1, taken from line II-II of FIG. 1, in accordance with some embodiments.
Figure 3:
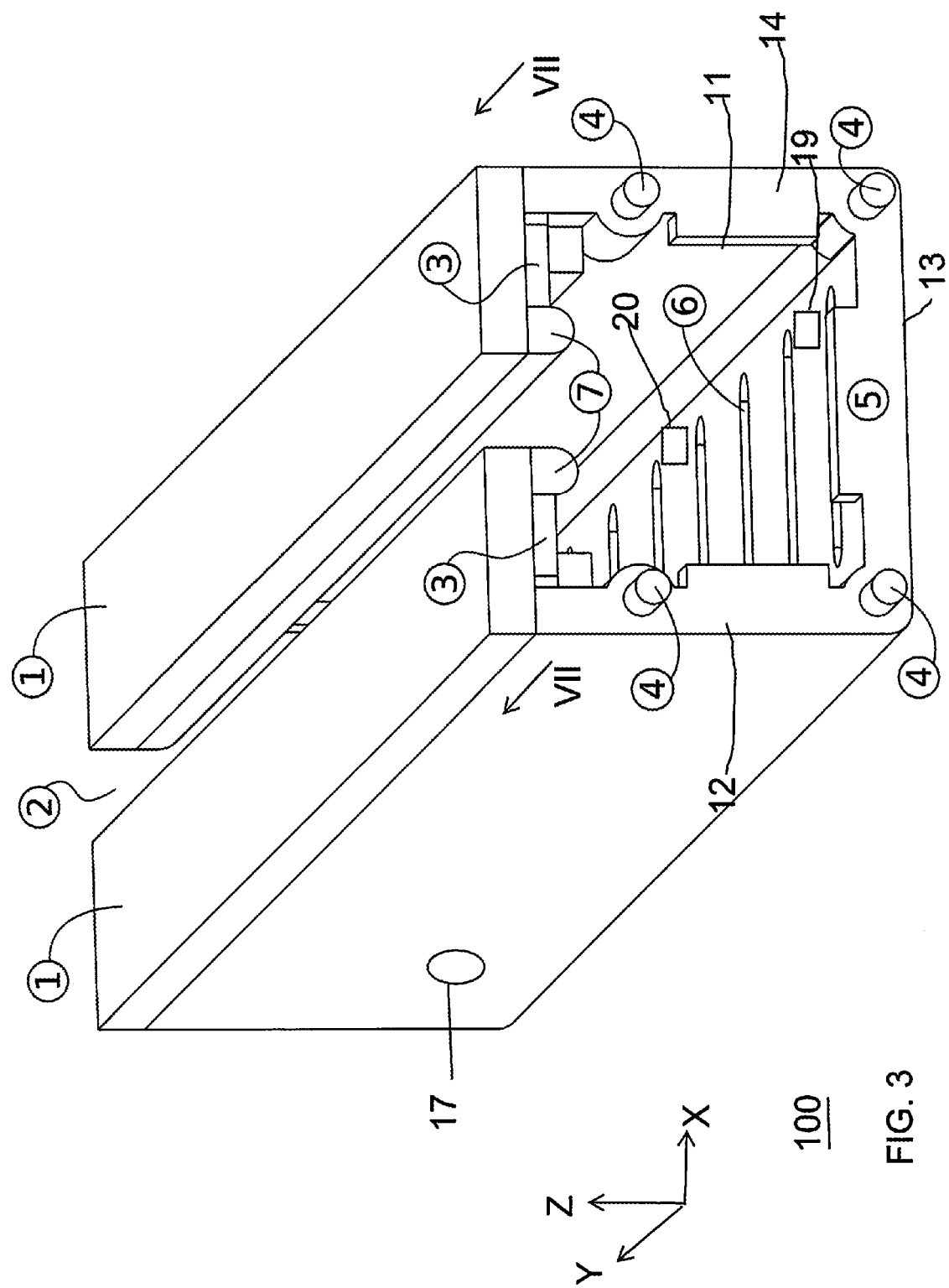
FIG. 3 is a perspective view of an illustrative in-road electric conductivity box of the system of FIGS. 1 and 2, in accordance with some embodiments.

As shown in FIG. 2, an in-road electric conductivity box 100 of series 101 may be embedded in road 400. For example, a top surface 1 of box 100 may be flush with or directly adjacent to or slightly raised from top surface 401 of road 400. Box 100 may include an opening 2 that may be provided through top surface 1 and that may run along at least a portion of the length of box 100 (e.g., along the Y-axis), such that opening 2 may be configured to allow vehicle 300 access to one or more electrical elements 3 that may be provided within a cavity 11 that may be defined by top surface 1, left side wall 12, bottom side wall 13, and right side wall 14 of box 100. For example, as shown in FIG. 2, vehicle 300 may include a probe 310 that may extend through opening 2 and into cavity 11 for accessing at least one electrical element 3, which may be positioned at least partially within cavity 11. Probe 310 may include a beam 311 that may extend away from vehicle 300 (e.g., downwardly from bottom 303 of vehicle 300, such as generally along the Z-axis) towards box 100 (e.g., through opening 2 and into cavity 11). Probe 310 may also include a support bar 312 that may extend away from an end or any other suitable portion of beam 311 for providing one or more electrical probe contacts 313 that may electrically couple with one or more box contacts or electrical elements 3 of box 100 (e.g., each probe contact 313 may be configured to electrically couple with a respective electrical element 3 during use). Probe 310 may be configured to retract or otherwise be disposed (e.g., under the control of component 320) within or along the main body of vehicle 300 when not being used for communicating with a box 100 (e.g., so that no portion of probe 310 is between bottom surface 303 of vehicle 300 and top surface 401 of road 400). As shown in FIG. 3, for example, opening 2 may extend along the entire length of box 100 (e.g., along the Y-axis), while the two ends of box 100 (e.g., along the Y-axis) may be at least partially open, such that at least a portion of probe 310 provided through opening 2 into cavity 11 may travel along the Y-axis into, along, and then out of cavity 11. Each probe contact 313 may be electrically coupled to any suitable electronic component 320 of vehicle 300 (e.g., via a coupling or bus 321). Bus 321 and portions of probe 310 (e.g., beam 311) may act as a conductor for power and/or data signals to be communicated between component 320 and box 100. Vehicle electronic component 320 may include a processor, computer, battery, and/or any other suitable electronic component(s) of vehicle 300 that may enable vehicle 300 to communicate data and/or power signals with box 100 (e.g., via an electrical coupling between one or more probe contacts 313 of probe 310 of vehicle 300 and one or more box contacts or electrical elements 3 of box 100). Power that may be received from box 100 by vehicle electronic component 320 may be used to at least partially power vehicle 300 (e.g., to propel vehicle 300 along roadway 400 and/or to power certain electronics, lights, controllers, and the like of vehicle 300), while data that may be received from box 100 by vehicle electronic component 320 may be used to at least partially control a function of vehicle 300 or to at least partially inform a user of vehicle 300 (e.g., to indicate traffic or weather conditions of system 1000 and/or charging properties of box 100, etc.). Probe 310 may be provided on vehicle 300 in any suitable way and may be configured to extend from vehicle 300 in any suitable direction to access box 100. For example, in some embodiments, probe 310 may extend from a top surface 305 or a side surface of vehicle 300 and may extend at some angle with respect to bottom surface 303 (e.g., any angle other than perpendicular, as shown in FIG. 2, with respect to bottom surface 303 (e.g., in a Y-Z plane)). Probe 310 may be configured to reconfigure itself between two or more configurations when in use for communicating with a box 100 to when not in use, where such reconfiguring may be at least partially under the control of component 320. Probe 310 may be retractable from its extended position (e.g., the configuration of probe 310 of FIG. 2), and support bar 312 and/or contacts 313 may only be extended or otherwise made accessible from beam 311 once beam 311 has been at least partially provided within cavity 11 (e.g., to enable passage through opening 2). In some embodiments, bar 312 may rotate (e.g., 90°) such that the length of beam 311 may be rotated out of the X-Z plane of FIG. 2 and into a Y-Z plane such that beam 311 (and contacts 313) may fit through opening 2 when moved in the downward direction of the Z-axis into cavity 11, and then bar 312 may be rotated again back to the configuration of FIG. 2 such that each contact 313 may align with a contact 3 of box 100 within cavity 11. Depth P of cavity 11 (e.g., the distance between top surface 1 and bottom 13 of box 100 (e.g., along the Z-axis)) may be any suitable depth that may be sufficient to allow suitable clearance of probe 310 from bottom 13 when fully inserted in cavity 11 for use with box 100. Such depth may also allow for some build up of debris or water in cavity 11 (e.g., along bottom 13) without affecting operation of the electrical coupling between probe contacts 313 and box contacts 3. Such electrical coupling between probe contacts 313 and box contacts 3 may not require direct contact therebetween, but may be provided with any suitable distance therebetween that can still enable the communication of data and/or power therebetween (e.g., power for at least partially enabling propulsion of vehicle 300, such as for powering vehicle component 320 via probe 310). In some embodiments, probe 310 may not extend from the normal design of vehicle 300, but instead power and/or data may be communicated wirelessly between box 100 and vehicle component 320 due to their proximity with one another on roadway 400. Component 320 may be positioned within a main body of vehicle 300 (e.g., between top surface 305 and bottom surface 303 of vehicle 300, such as where a user of vehicle 300 may be positioned), while contact 313 of probe 310 may be positioned outside of such a main body of vehicle 300 when communicating with box 100 (e.g., as shown in FIG. 2).

Box 100 may be set in a cavity 403 in road 400 that may have been hollowed out or molded in road 400, such that, for example, box 100 may be positioned at least partially therein, and/or such that top surface 1 of box 100 may be flush with or adjacent to top surface 401 of road 400 (e.g., cavity 403 of road 400 may have a depth similar to or slightly large than or slightly less than depth P). This configuration may be similar to flush settings that may exist for sewage manhole tops, road drainage grates, and the like. Alternatively, bottom 13 of box 100 may be bolted to top 401 of road 400 (e.g., with curved or angled sides 12 and 14) to enable one or more tires 301 of vehicle 300 to safely change lanes as they pass over and atop box 100 (e.g., along a direction of the X-axis). In this case, provisions may be made for road drainage across the lanes, under box 100, for example, via drainage grooves 6 of FIG. 3 that may be interspersed along and/or through bottom 13 of box 100, or a mechanism to lift box 100 modestly, (e.g., via compression springs underneath bottom 13 of box 100), for example, to provide underside clearance for water or other debris underneath box 100. Box 100 may be coupled to road 400 in any suitable position with respect to top roadway surface 401 (e.g., bottom surface 13 of box 100 may be above or flush with roadway surface 401, bottom surface 13 of box 100 may be below roadway surface 401 (e.g., in cavity 403) while top surface 1 of box 100 may be above, below, or flush with roadway surface 401, etc.).

The width of box 100 (e.g., the width of bottom surface 13) along the X-axis of FIG. 3 may be of any suitable dimensions, such as in the range of 4 inches to 18 inches, and the height of box 100 (e.g., the height of left side wall 12) along the Z-axis of FIG. 3 may be of any suitable dimensions, such as 2 inches to 12 inches, while the length of box 100 (e.g., the length of box 100 extending along road 400 in the direction of arrow D) along the Y-axis of FIG. 3 may be any suitable dimensions, such as in the range of 2 feet to 50 feet. While cavity 11 may be enclosed generally by top 1 left side 12, bottom 13, and right side 14, box 100 may include perforations or other elements 6 to facilitate drainage of debris from cavity 11. External protrusions may also exist to facilitate attachment to in-road steel mesh or other suitable features of road 400. One or more of sides 12 and 14 and base 13 of box 100 may be flat, rounded, or angled relative to each other. One or more of sides 12 and 14 and bottom 13 of box 100 may be made of strong structural materials, such as cast iron, that may be used in the common interface of drainage and sewage networks with road systems, or other heavy-duty material(s) of similar strength. A drainage subsystem 17 may consist of pumps within box 100 or within certain boxes 100 at certain intervals along series 101 that may eject water or other debris out of box 100 or out of a series of adjacent boxes 100. Pitching of bottom 13 or of the entire structure of box 100 (e.g., with respect to gravity) may be used to accommodate the flow of water towards a pump or drainage mechanism. Drainage subsystem 17 of box 100 may also include one or more air blowers that may also be used in conjunction with box 100 to aid in drainage and drying. Alternatively, drainage may be entirely gravity driven in the case where the road bed of road 400 may be elevated and drainage through the bottom of box 100 (e.g., through elements 6) may be fed into a system of drainage channels that may ultimately direct water laterally away from the road bed.

One or more snow and/or ice removal subsystems 19 may be incorporated into box 100 and may be configured to heat or melt snow and/or ice above or beside box 100 and/or within cavity 11 of box 100. Heating may be accomplished using electrical heating elements of subsystem 19 that can be embedded in box 100 and/or by circulation of heated fluid in piping that may run within or adjacent to box 100. Alternatively, saltwater or any other suitable melting substance may be ejected to the road bed and/or taken in from the road bed for accelerated drainage. Such snow and ice subsystems 19 may allow for accelerated snow and ice removal via sweeping, blowing, plowing, pushing, scooping, shoveling, or gathering for melting or redistribution to the roadside or other locality. Automated or manually controlled special-purpose snow, ice, and debris inspection, prevention, and removal vehicles, which may or may not be running on electric power through box 100, may accomplish these tasks in conjunction with or in place of subsystem 19. The status of water, snow, or debris within box 100 maybe monitored by a system of cameras of subsystem 19 that may be mounted either within cavity 11 or on probes (e.g., probe 310) that may be positioned within cavity 11 by an inspection and maintenance vehicle. Additionally or alternatively, the level of water in cavity 11 may be monitored by a series of water level sensors of subsystem 19. Debris levels may be monitored by a series of light sources and detectors of subsystem 19 that may be configured to determine the level of obstruction in light shined down the length of box 100. Debris levels may also be assessed by measuring changes in acoustic transmission or air directed down the length of box 100.

Figure 5:
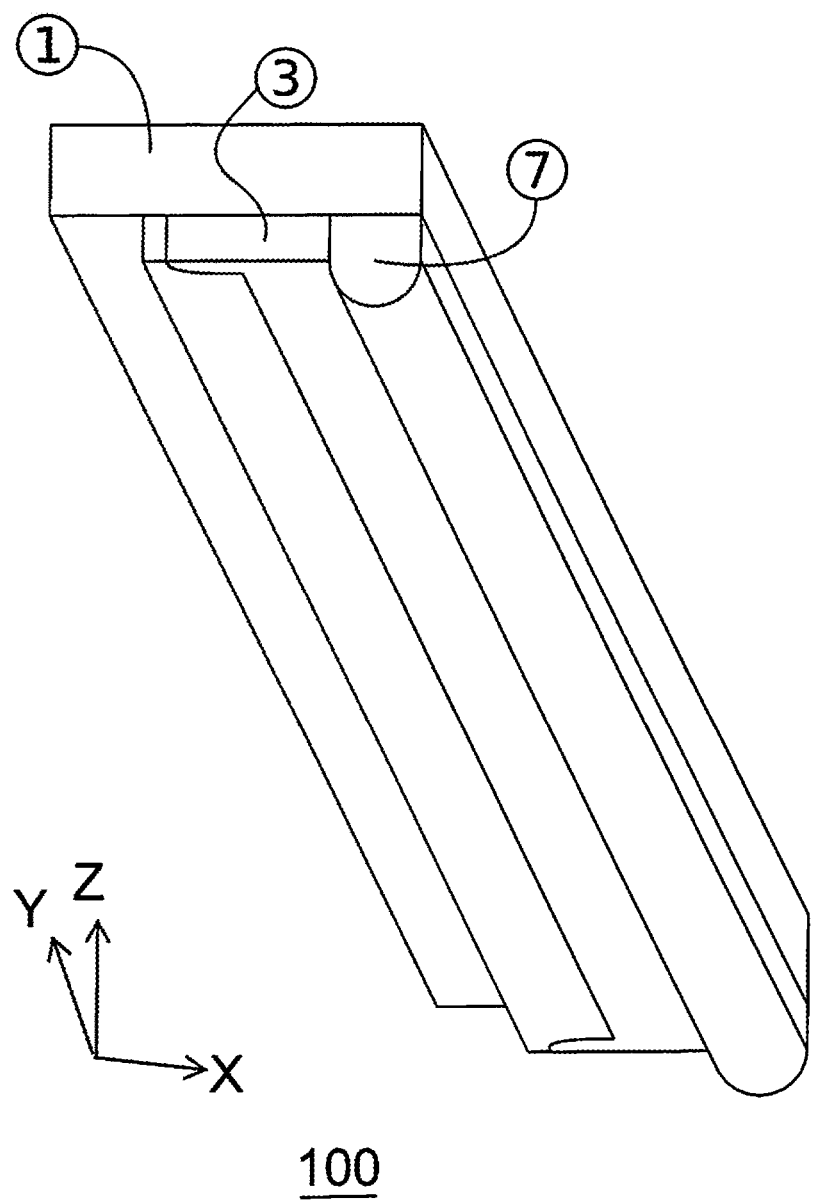
FIG. 5 is a perspective view of one of the top portions of the illustrative in-road electric conductivity box of FIGS. 1, 2, 3, and 4, in accordance with some embodiments.
Figure 6:
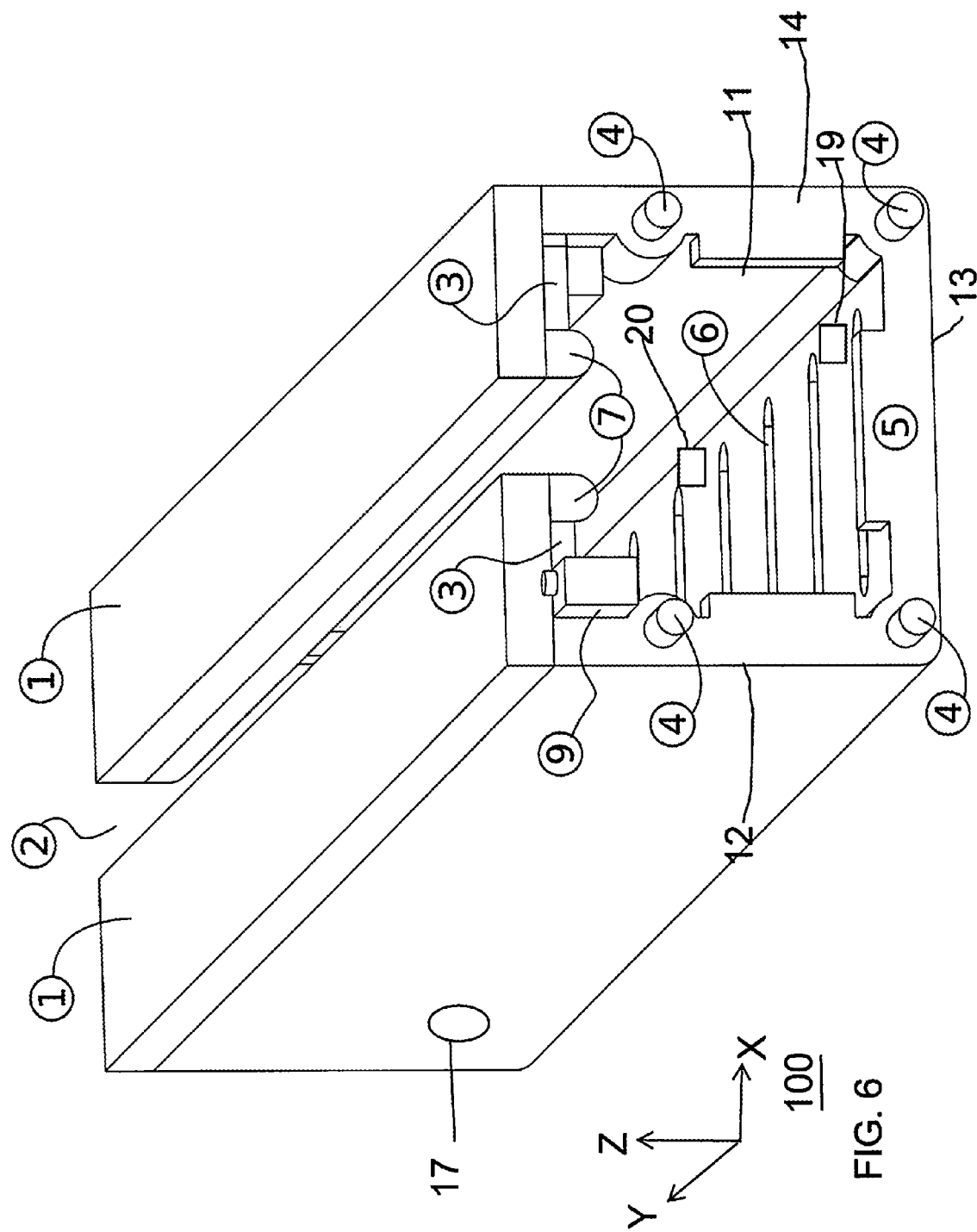
FIG. 6 is a perspective view of the illustrative in-road electric conductivity box of FIGS. 1, 2, 3, 4, and 5, but with at least one additional element, in accordance with some embodiments.

As shown in FIGS. 3, 4, and 5, for example, top 1 of cavity 11 of box 100 may include two sections, each of which may be affixed to a respective side of box 100 (e.g., side wall 12 and side wall 14, thereby defining opening 2) (e.g., lower U-shaped section of walls 12-14 of cavity 11) with bolts or other connection mechanisms, and may be intended to be removable (see, e.g., a first removable top section 1 in FIG. 5 removed from the portion of box 100 of FIG. 4). Each section of top 1 may be removed during assembly/installation of box 100, as easier/greater access into cavity 11 may be needed to secure any clamps holding adjacent boxes 100 together and/or to install any ancillary devices (e.g., subsystems 17 and/or 19) in cavity 11 (e.g., access not sufficiently provided via opening 2). Additionally, one or both top sections 1 of box 100 may need to be replaced due to damage, regular wear, or design changes that may not affect the remaining in-road components. Each top 1 may be removed to modify sides 12 and/or 14 for height adjustment due to road height changes from repaving, sinkage, or other mechanisms. Each top 1 may be made of any suitable durable, wear-resistant, and/or non-conductive material and may have one or more electrical conducting elements 3 embedded therein or coupled thereto (see, e.g., FIGS. 3 and 5, where a conducting element may extend along at least a portion of the length of an inner surface of top section 1 (e.g., along the Y-axis)). Alternatively, one or more tops 1 may be made of a conductive material and may have an insulating layer between the top conductive material and one or more conducting elements 3. Each conducting element 3 may run at least a portion of the length of top 1. A first conducting element 3, which may be coupled to a first of two top sections 1 of a particular box 100, may provide a first type of signal, such as a positive signal, while a second conducting element 3, which may be coupled to a second of two top sections 1 of the particular box 100, may provide a second type of signal, such as a negative signal, where two different contacts 313 of probe 310 may be electrically coupled to respective different ones of the two conducting elements 3 of that particular box 100 (e.g., at a single particular time). One or more lips 7 may run along the length of each top segment 1 (e.g., next to the conducting element 3 on the side that may form at least a portion of a slot opening 2 at the top of cavity 11). At one or both ends of each segment of top 1 of each box 100, an additional pad 5 of conducting material may be added to facilitate the establishment of electrical continuity between adjacent boxes 100 of series 101 (e.g., pad 5 of FIG. 6, which may be a portion or all of coupling 103 of FIG. 1). Electrical continuity between conducting elements within adjacent segments of top 1 (e.g., along the Y-axis of series 1) may be achieved via one or more connecting elements 9 that may be mounted between adjacent segments 1 of adjacent boxes 100 of series 101. Such a connecting element 9 of a first box 100 may make contact with an additional pad of conducting material at an end of one or both tops 1 of a second adjacent box 100 or of each adjacent box 100 in series 101 (e.g., element 9 of FIG. 6, which may be a portion or all of coupling 103 of FIG. 1). Contact may be made between an element 9 and a top 1 when a top 1 is installed. Alternatively, two consecutive boxes 100 may be electrically distinct and not electrically coupled to one another, such that each box 100 may be independently coupled to a power source. One or more contacts in connecting element 9 may be spring-loaded and may compress to make a firm connection as a top 1 is affixed in place. Rather than separate and removable top pieces 1, such top pieces 1 may also form a part of sides 12 and/or 14 of box 100. Each top piece 1 may be flat or rounded. Alternatively, one or more conducting elements 3 within cavity 11 may be affixed to one or more of sides 12 or 14 or base 13, rather than or in addition to top 1, and contacts 313 of probe 310 may be configured to electrically communicate with such elements 3 in any suitable manner. One or more adjacent boxes 100 of series 101 may form a circuit that may receive power from the road side or lower in the road bed of road 400 (e.g., from one or more of power sources 202 and/or 220). The length of such circuits may be selected such that the power requirement for traffic along the circuit may be within the capacity of the conducting elements 3 in each box 100 and the associated power source(s) for the circuit. Although these circuits may always be on, they may also be switched on and off independent of adjacent circuits along road 400 in the cases of emergencies, outages, and/or to optimize power consumption of system 1000. Each box 100 may contain multiple sets of conducting wires at various positions along box 100 or set of boxes 100 (e.g., couplings 205/207) that may enable additional power capacity, thereby requiring fewer feeds of electricity into box 100, or additional electricity at a different voltage to power a more diverse array of vehicles 400, such as trucks or buses with larger electric motors.

Each box 100 may contain one or more data components 20 that may be configured to receive data from and/or provide data to electronic component 320 of vehicle 300. For example, data component 20 may be configured to provide internet transmission abilities, automated driver assistance abilities, sensors for moisture, movement, temperature, animals, or any other environmental variable, presence, or condition within system 1000 (e.g., at that box 100 and its surrounding environment). Such sensors of component 20 of a box 100 may also be present to enable computation of vehicle count, velocity, type, speed, braking distance, vehicle breakdown, vehicle accident occurrence, traffic conditions, electricity demand, electricity consumption, or erratic vehicle behavior such as swerving, drunken driving behavior, driver dozing behavior, or any other suitable type of information that may at least partially be based on vehicle data that may be received from electronic component 320 of one or more vehicles 300 at that box 100 (e.g., as probe 310 may communicate such data with one or more suitable contact 3 of box 100 when vehicle 300 is engaged with box 100). Alternatively or additionally, the ability to sense an unmaintained or dangerous vehicle 300 or a warranted search of a particular vehicle 300 may be enabled by data component 20 and its ability to receive from or transmit data to component 320 of vehicle 300. Such information on any suitable system status of system 1000 may be used to manage system operation and may also be transmitted back to vehicles 300 on the road, either directly via interaction of a box 100 with one or more vehicles 300 or through any suitable data transmission service, to allow users to manage charging or power receipt from boxes 100 under varying traffic conditions. As shown in FIG. 1, system 1000 may include a master system data component 520 that may be configured to collect any data that may be received from each of the data components 20 of each of the boxes 100 of system 1000 (e.g., for receiving traffic data related to one or more vehicles 300 that may have communicatively engaged with such component(s) 20, for receiving performance and/or status information related to such component(s) 20 or their associated boxes 100, etc.). Additionally or alternatively, master system data component 520 may be configured to transmit data to a particular one, some, or all of the data components 20 of the boxes 100 of system 1000 (e.g., for updating computational software/firmware of such component(s) 20, for providing data to be shared with one or more vehicles 300 that may communicatively engage with such component(s) 20, etc.). System component 520 may leverage the same communication architecture of power subsystem 200 (e.g., master coupling 204, couplers 203, local couplings 205/207, etc.) for communicating such data with one or more boxes 100 as master power source 220 may leverage for communicating power with one or more boxes 100. Alternatively, separate communication architectures may be leveraged by system component 520 and power source 220 for communicating with one or more boxes 100 (e.g., one architecture may be wired while the other may be wireless). Data received by system component 520 from boxes 100 and, thus, in some embodiments, from one or more vehicles 300, may be used for any suitable purpose, such as for providing a centralized data source for weather information, traffic information, power information, and the like for roadway 400 (e.g., to third party applications that may be accessed by portable electronic devices, or to system analyzers that may utilize the data to study patterns associated with roadway 400). Data that may be provided by system component 520 to boxes 100 and, thus, in some embodiments, to one or more vehicles 300, may be of any suitable type and/or may be used for any suitable purpose, such as for providing a centralized data source for weather information, traffic information, power information, and the like for roadway 400. Data received by system component 520 may be manipulated or computed using any suitable methods for generating data to be transmitted from system component 520. System component 520 may be a subsystem with one or more processors, servers, memories, communication components, sensors, power supplies, and the like for providing an overarching system level environment for all data communicated throughout system 1000.

Access to electrical elements 3 in box 100 may be accomplished through opening 2 in top 1. Such opening 2 may be any suitable size width (e.g., in the X-axis of FIG. 3), such as in the range of a 4 ($\frac{1}{16}$th) inch to 12 inches. The sides of lips 7 at least partially defining opening 2 may be straight (see, e.g., FIG. 7, where a side of lip 7 may be straight along the Z-axis and then curve away from opening 2) or angled (see, e.g., FIG. 8, where a side of lip 7 at least partially defining opening 2 may be angled to gradually increase the width of opening 2 in the downward direction along the Z-axis). Opening 2 may be at least partially reduced in size or closed to prevent rain, snow, and/or other debris from entering cavity 11 of box 100, such as via a flap or other opening mechanism 23 (see, e.g., FIG. 8) that may be affixed to or nested in cavity 11 (e.g., on one or more tops 1 or lips 7) that may open to allow a probe 310 of an overpassing vehicle 300 to access cavity 11 through opening 2, but that may close when such access is no longer needed (e.g., by reducing the size of opening 2 (e.g., along the X-axis)). Opening 2 may also be closed with an internal surface blocking mechanism 23 within box 100 that may recede, open, or descend into cavity 11 in any way to allow a probe 310 of an overpassing vehicle 300 to access element 3 through opening 2. Such a mechanism 23 may be composed of rubber or other material. The ascent/descent of mechanism 23 and/or probe 310 may be controlled by a spring, and/or an electronic or other ascent/descent compression system, which may either be passive or active (see, e.g., FIG. 7A as described below). Probe 310 may contact mechanism 23 to move mechanism 23 to a new position that does not block opening 2 when probe 310 accesses cavity 11.

To achieve electrical transmission between box 100 and vehicle 300, an on-vehicle descent and pivot contact probe 310 may be provided on or coupled to vehicle 310, where such a probe 310 may descend through opening 2, into cavity 11, and then electrically couple (e.g., via one or more electrical contacts 313 of probe 310) with one or more elements 3 of box 100. A manual or automated on-vehicle system (e.g., a portion of component 320) may identify the location of a box 100 and/or its opening 2 along road 400 and may maintain tracking of elements 3 within box 100. Tracking of such elements 3 within box 100 may be facilitated by in-vehicle sensors of component 320 or probe 310 of vehicle 300 and/or component 20 of box 100 that may monitor driver input and/or vehicle movement that may feed into the contact control system of component 320 and/or component 20. When a gap closure mechanism 23 may be used, opening 2 may be opened via an automated opening mechanism or downward pressure from vehicle 300 (e.g., probe 310) onto the receding gap-closing surface or by other means of providing the clearance to opening 2 to allow the on-vehicle descent and pivot contact 313 of prove 310 to descend into box 100. Probe 310 may be configured to enable a pivot or any other suitable mechanized movement of electrical contacts 313, such as carbon brushes, to move into contact with conductors 3 in cavity 11 of box 100. Such a contact 313 may be withdrawn rapidly from cavity 11 under various circumstances (e.g., as may be detected by component 20 and/or 320), such as driver option, lane change (e.g., detection of a turn signal actuation or rotation of a steering wheel beyond a threshold amount as compared to the curvature of road 400), imminent crash detection, road flooding, excessive electrical demand on conducting wires, on-vehicle electric problems, and/or other adverse events.

Power drawn by an overpassing vehicle 300 may be monitored and controlled by a control system within vehicle 300 (e.g., component 320) and/or by one or more components 20 of boxes 100 of system 1000. In some embodiments, higher power may not be drawn by vehicle 300 until some initial sensing, communicating, or other "handshaking" between vehicle 300 and one or more boxes 100 may determine that electrical contact has been established. Such a power draw may also be reduced prior to withdrawal of probe 310 and/or if adverse conditions were detected by component 20 and/or 320. A low power draw state may allow for arc suppression as electrical communication is being made/interrupted between contacts 3 and 313.

While the above-description of certain embodiments with respect to FIGS. 1, 2, 3, 4, 5, 6, 7, and 8 describes a single series 101 of adjacent boxes 100 that may align end to end along a direction of a road, where each box 100 may provide a single cavity 11 within which one or more contacts of probe 310 may extend to electrically couple a vehicle with other components of a system 1000, it is to be understood that various other configurations for a system of this disclosure may be provided. For example, as described below with respect to FIGS. 1A, 2A, 3A, 5A, and 7A, a system 1000' may include two parallel series 101' (e.g., series 101a' and 101b') of adjacent boxes 100' that may align end to end along a direction of a road (e.g., the direction of axis Y), where each of series 101a' and 101b' may be adjacent one another in a direction substantially perpendicular to the direction of the road (e.g., the direction of axis X), and/or where a first box 100' of first series 101a' may provide a first cavity 11' within which a first contact of a probe 310 may extend to electrically couple a vehicle with an electrical component of that first box 100' while a second box 100' of second series 101a' that may be adjacent to first box 100' (e.g., in the direction of axis X) may provide a second cavity 11' within which a second contact of that probe 310 may extend to electrically couple the vehicle with an electrical component of that second box 100'. The use of parallel series of conductivity boxes 100' may provide one or more advantages relative to the use of a single series of conductivity boxes 100. For example, further safety against in-box shorting out may be achieved due to separation of positive and negative contacts of a probe 310 (e.g., where a first box 100' of first series 101a' may provide a first type of signal, such as a positive signal (e.g., provides a positive pole), while a second box 100' of second series 101b' may provide a second type of signal, such as a negative signal (e.g., provides a negative pole)), as two different contacts of probe 310 may be contained within cavities 11' of two different boxes 100' of two different series 101' at a particular time. Additionally or alternatively, a narrower possible box width may be achieved when only a single contact of a probe 310 is positioned within a cavity of the box, which may reduce structural pressure from overpassing vehicles and/or may reduce box dimensions, materials, and/or installation cost.

Figure 2A:
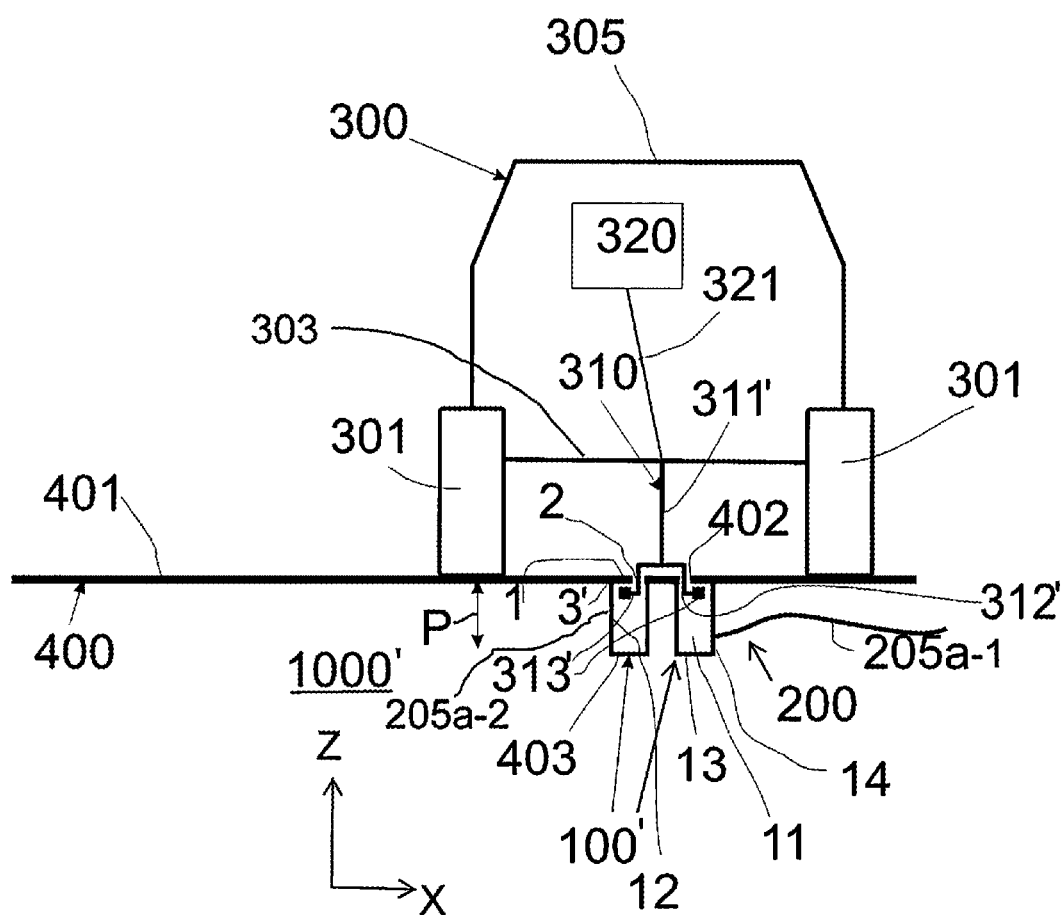
FIG. 2A is a cross-sectional side view of the illustrative in-road electric conductivity system of FIG. 1A, taken from line IIA-IIA of FIG. 1A, in accordance with some embodiments.

As shown in FIG. 1A, an in-road electric conductivity system 1000' may include two series 101' (e.g., series 101a' and 1011b') of parallel in-road electric conductivity boxes 100' that may be provided underneath, adjacent to, on top of, or otherwise along road 400 on which vehicle 300 may travel. System 1000' may also include power subsystem 200 that may include series 201 of one or more local power sources 202 (e.g., local power sources 202a and 202b) that may be provided underneath, adjacent to, on top of, or otherwise along road 400. Each pair of a set of adjacent and parallel in-road electric conductivity boxes 100' may be electrically coupled to or otherwise configured to receive electric power, whether single phase, two phase, or three phase, from at least one local power source 202 of power subsystem 200 (e.g., via one or more local couplings 205 and/or 207 (e.g., couplings 205a/207a of local power source 202a or couplings 205b/207b of local power source 202b). As shown in FIG. 2A, a first line 205a-1 of local coupling 205a may be electrically coupled to a first box 100' (e.g., of first series 101a'), while a second line 205a-2 of local coupling 205a may be electrically coupled to a second box 100' (e.g., of second series 101a'). In some embodiments different local power sources 202 may be electrically coupled to different boxes 100'. For example, as shown in FIG. 1A, a first set of four (4) boxes 100' may be electrically coupled to each other via electrical couplings 103, and those four (4) boxes 100' may be electrically coupled to local power source 202b via one or both of couplings 205b and 207b of local power subsystem 2101), whereas another set of four (4) boxes 100' may be electrically coupled to each other via electrical couplings 103, and those four (4) boxes 100' may be electrically coupled to local power source 202a via one or both of couplings 205a and 207a of a local power subsystem 210a. Any suitable number of local power subsystems 210 may be provided along one or more roads 400 and any suitable number of boxes 100 may be electrically coupled to each local power subsystem 210. Each box 100' of an adjacent set within a particular series 101' may be separated any suitable distance from one another (e.g., along the Y-axis) that may still enable vehicle 300 to receive adequate power from system 1000' for use while traveling along road 400. Such adjacent boxes 100' may be aligned via locating pins that may extend between adjacent boxes 100'. Such adjacent boxes 100' may be affixed to each other via clamps and/or any other suitable attachment mechanisms that may be formed into adjacent ends of adjacent boxes 100'. Alternatively, such adjacent boxes may be physically independent and distinct. Each box 100' of an adjacent set of two different series 101' may be separated any suitable distance from one another (e.g., along the X-axis) that may still enable vehicle 300 to receive adequate power from system 1000' for use while traveling along road 400. Such adjacent boxes 100' may be aligned via locating pins that may extend between adjacent boxes 100'. Such adjacent boxes 100' may be affixed to each other via clamps and/or any other suitable attachment mechanisms that may be formed into adjacent ends of adjacent boxes 100'. Alternatively, such adjacent boxes may be physically independent and distinct.

Each local power source 202 of system 1000' may be its own independent source of power to the one or more boxes 100' it is electrically coupled to. For example, each local power source 202 may be a battery or a solar powered generator or any other suitable source of power that may be provided along road 400. Alternatively or additionally, two or more local power sources 202 (e.g., local power sources 202a and 202b) may be electrically coupled to a common master power source 220 via a master coupling 204, where each local power source may be coupled to the master coupling 204 via its own electrical coupler 203 (e.g., local power source 202a may be electrically coupled to master coupling 204 via coupling 203a, and local power source 202b may be electrically coupled to master coupling 204 via coupling 203b). Master power source 220 may be any suitable power source, such as an electrical grid, a nuclear power plant, or the like.

As shown in FIG. 2A, parallel in-road electric conductivity boxes 100' of parallel series 101a' and 101b' may be embedded in road 400. For example, a top surface 1' of one or both of parallel boxes 100' may be flush with or directly adjacent to or slightly raised from top surface 401 of road 400. Each box 100' may include an opening 2' that may be provided through top surface 1' and that may run along at least a portion of the length of box 100', such that opening 2' may be configured to allow vehicle 300 access to one or more electrical elements 3' that may be provided within a cavity 11' that may be defined by top surface 1', left side wall 12, bottom side wall 13, and right side wall 14 of that box 100'. For example, as shown in FIG. 2A, vehicle 300 may include a probe 310, which may include a first portion with a first electrical element 313' that may extend through opening 2' and into cavity 11' of a first box 100' of series 101a' for accessing at least one electrical element 3' of that first box 100', and a second portion with a second electrical element 313' that may extend through opening 2' and into cavity 11' of a second box 100' of series 101b' for accessing at least one electrical element 3' of that second box 100'. Probe 310 may include a beam 311' that may extend away from vehicle 300 (e.g., downwardly from bottom 303 of vehicle 300) towards parallel boxes 100'. Probe 310 may also include a support bar 312' that may extend away from an end or any other suitable portion of beam 311' for providing a first electrical probe contact 313' that may electrically couple with one or more electrical elements 3' of a first box 100' of series 101a' of FIG. 2A and for providing a second electrical probe contact 313' that may electrically couple with one or more electrical elements 3' of a second box 100' of series 101b' of FIG. 2A. Each probe contact 313' may be electrically coupled to any suitable electronic component 320 of vehicle 300 (e.g., via coupling or bus 321). Vehicle component 320 may be a processor, computer, battery, or any other suitable electronic component of vehicle 300 that may enable vehicle 300 to communicate data and/or power signals with parallel boxes 100' (e.g., via an electrical coupling between probe contacts 313' and box contacts 3'). Probe 310 may be retractable from its extended position, and each contact 313' may only be extended or otherwise made accessible from a respective end or portion of support bar 312' once that respective end or portion of support bar 312' has been at least partially provided within cavity 11' of its respective box 100'. Depth P of cavity 11' (e.g., the distance between top surface 1' and bottom 13 of a parallel box 100') may be any suitable depth sufficient to allow clearance of probe 310 from bottom 13 when fully inserted in cavity 11' for use with parallel box 100'. Such depth may also allow for some buildup of debris or water in cavity 11' without affecting operation of the electrical coupling between a probe contact 313' and a box contact 3'. Such electrical coupling between probe contacts 313' and box contacts 3' may not require direct contact therebetween, but may be provided with any suitable distance therebetween that can still enable the communication of data and/or power therebetween (e.g., power for at least partially enabling propulsion of vehicle 300).

Each box 100' may be set in a cavity 403 in road 400 that has been hollowed out or molded in road 400, such that, for example, that box 100' may be positioned at least partially therein such that top surface 1' of box 100' may be flush with or adjacent to top surface 401 of road 400 (e.g., cavity 403 of road 400 may have a depth similar to or slightly large than depth P). This configuration may be similar to flush settings that may exist for sewage manhole tops, road drainage grates, and the like. Each box 100' of two parallel and adjacent boxes 100' (e.g., the two boxes 100' of FIG. 2A) may be at least partially set in the same cavity 403 or in two distinct independent cavities 403. Alternatively, bottom 13 of a boxes 100' may be bolted to top 401 of road 400 (e.g., with curved or angled sides 12 and 14) to enable one or more tires 301 of vehicle 300 to safely change lanes as they pass over and atop box 100'. In this case, provisions may be made for road drainage across the lanes, under parallel boxes 100', for example, via drainage grooves 6 of FIG. 3A that may be interspersed along bottom 13 of boxes 100', or a mechanism to lift one or both of parallel boxes 100' modestly (e.g., via compression springs underneath bottom 13 of parallel boxes 100'), for example, to provide underside clearance for water underneath parallel boxes 100'. Box 100' may be coupled to road 400 in any suitable position with respect to top roadway surface 401 (e.g., bottom surface 13 of box 100' may be above or flush with roadway surface 401, bottom surface 13 of box 100' may be below roadway surface 401 (e.g., in cavity 403) while top surface 1' of box 100' may be above, below, or flush with roadway surface 1, etc.).

The width of a box 100' (e.g., the width of bottom surface 13) along the X-axis of FIG. 3A may be of any suitable dimensions, such as in the range of 1 inch to 6 inches, and the height of a box 100' (e.g., the height of left side wall 12) along the Z-axis of FIG. 3A may be of any suitable dimensions, such as 1 inch to 12 inches, while the length of a box 100' (e.g., the length of box 100' extending along road 400 in the direction of arrow D) along the Y-axis of FIG. 3A may be any suitable dimensions, such as in the range of 2 feet to 50 feet. While cavity 11' may be enclosed generally by top 1', left side 12, bottom 13, and right side 14, box 100' may include perforations or other elements 6 to facilitate drainage of debris from cavity 11'. External protrusions may also exist to facilitate attachment to in-road steel mesh. One or more of sides 12 and 14 and base 13 of box 100' may be flat, rounded, or angled relative to each other. One or more of sides 12 and 14 and base 13 of box 100' may be made of strong structural materials, such as cast iron, that may be used in the common interface of drainage and sewage networks with road systems, or other heavy-duty material of similar strength. Drainage subsystem 17 may include pumps within parallel boxes 100' or within certain boxes 100' at certain intervals along one or both series 101' that may eject water or other debris out of boxes 100'. Pitching of base 13 of one or more boxes 100' (e.g., with respect to gravity) may be used to accommodate the flow of water towards a pump or drainage mechanism. Drainage subsystem 17 of a box 100' may also include one or more air blowers that may be used to aid in drainage and drying. Alternatively, drainage may be entirely gravity driven in the case where the road bed of road 400 may be elevated and drainage through the bottom of box 100' may be fed into a system of drainage channels that may ultimately direct water laterally away from the road bed.

One or more snow and ice removal subsystems 19 may be incorporated into a box 100' and may be configured to heat or melt snow and ice above or beside such a box 100' and within cavity 11' of box 100'. The status of water, snow, or debris within a box 100' may be monitored by a system of cameras of subsystem 19 mounted either within cavity 11' or on a probe (e.g., a portion of probe 310) that may be positioned within cavity 11' by an inspection and maintenance vehicle or any vehicle 300. Additionally or alternatively, the level of water in cavity 11' may be monitored by a series of water level sensors of subsystem 19. Debris levels may be monitored by a series of light sources and detectors of subsystem 19 that may be configured to determine the level of obstruction in light shined down the length of one or more boxes 100'. Debris levels may also be assessed by measuring changes in acoustic transmission or air directed down the length of one or more boxes 100'.

As shown in FIGS. 3A and 5A, for example, top 1' of cavity 11' of a box 100' (e.g., box 100' of series 101b') may a single section coupled to a side of one wall 14 (e.g., right side wall 14), such as with bolts or other connection mechanisms. An opening 2' may be provided for access to cavity 1' through the top of cavity 1' (e.g., along the side of single top 1' between top 1' and side wall 12). In other embodiments, box 100' may include two or more top portions, as described above with respect to box 100. One or each top of box 100' may be intended to be removable (see, e.g., a removable top section 1' in FIG. 5A removed from box 100' of FIG. 3A). Top 1' may be removed during assembly/installation of box 100', as access into cavity 11' may be needed to secure any clamps holding adjacent boxes 100' together and/or to install any ancillary devices (e.g., subsystem 17 and/or 19) in cavity 11' (e.g., access not already provided via opening 2'). Additionally, a top of box 100' may need to be replaced due to damage, regular wear, or design changes that do not affect the remaining in-road components. Each top of box 100' may be removed to modify sides 12 and/or 14 for height adjustment due to road height changes from repaving, sinkage, or other mechanisms. Each top 1' may be made of any suitable durable, wear-resistant, non-conductive material and may have one or more electrical conducting elements 3' embedded therein or coupled thereto (see, e.g., FIGS. 3A and 5A). Alternatively, one or more tops 1' may be made of a conductive material and may have an insulating layer between the top conductive material and one or more conducting elements 3'. Each conducting element 3' may run at least a portion of the length of top 1'. One or more lips 7' (e.g., an edge of a top 1' or an appendage thereto) may run along the length of a top segment 1' (e.g., next to conducting element 3' on a side that forms at least a portion of opening 2'. Rather than one or more separate and removable top pieces 1', such top pieces 1' may also form a part of sides 12 and/or 14 of a box 100'. Each top piece 1' may be flat or rounded or any suitable shape. Alternatively, one or more conducting elements 3' within cavity 11' may be affixed to one or more of sides 12 or 14 or base 13, rather than or in addition to top 1', and a particular contact 313' of probe 310 may be configured to electrically communicate with such an element 3' in any suitable manner. One or more boxes 100' may form a circuit that may receive power from the road side or lower in the road bed of road 400 (e.g., from one or more of power sources 202 and/or 220). The length of such a circuit may be selected such that the power requirement for traffic along the circuit may be within the capacity of the conducting elements 3' in boxes 100' and the associated power source(s) for the circuit. Although these circuits may always be on, they may also be switched on and off independent of adjacent circuits along road 400 in the cases of emergencies, outages, and to optimize power consumption of system 1000'. Each parallel box 100' may contain multiple sets of conducting wires at various positions along one or more boxes 100' or sets of boxes 100' (e.g., couplings 205/207) that may enable additional power capacity, thereby requiring fewer feeds of electricity into boxes 100', or additional electricity at a different voltage to power a more diverse array of vehicles 400, such as trucks or buses with larger electric motors.

Each box 100' may contain one or more data components 20 that may be configured to receive data from and/or provide data to electronic component 320 of vehicle 300. For example, as described above with respect to system 1000, a data component 20 of a box 100' may be configured to provide internet transmission abilities, automated driver assistance abilities, sensors for moisture, movement, temperature, animals, or any other environmental variable, presence, or condition within system 1000'. Such sensors of component 20 may also be present to enable computation of vehicle count, velocity, type, speed, braking distance, vehicle breakdown, vehicle accident occurrence, traffic conditions, electricity demand, electricity consumption, or erratic vehicle behavior such as swerving, drunken driving behavior, driver dozing behavior, and/or any other suitable type of information that may at least partially be based on vehicle data that may be received from electronic component 320 of one or more vehicles 300 that may engage a box 100'. Alternatively or additionally, the ability to sense an unmaintained or dangerous vehicle 300 or a warranted search of a particular vehicle 300 may be enabled by data component 20 and its ability to receive from or transmit data to component 320 of vehicle 300. Such information on any suitable system status of system 1000' may be used to manage system operation and may also be transmitted back to vehicles 300 on the road, either directly via interaction of a box 100' with one or more vehicles 300 or through any suitable data transmission service, to allow users to manage charging or power receipt from box 100' under varying traffic conditions.

Figure 7:
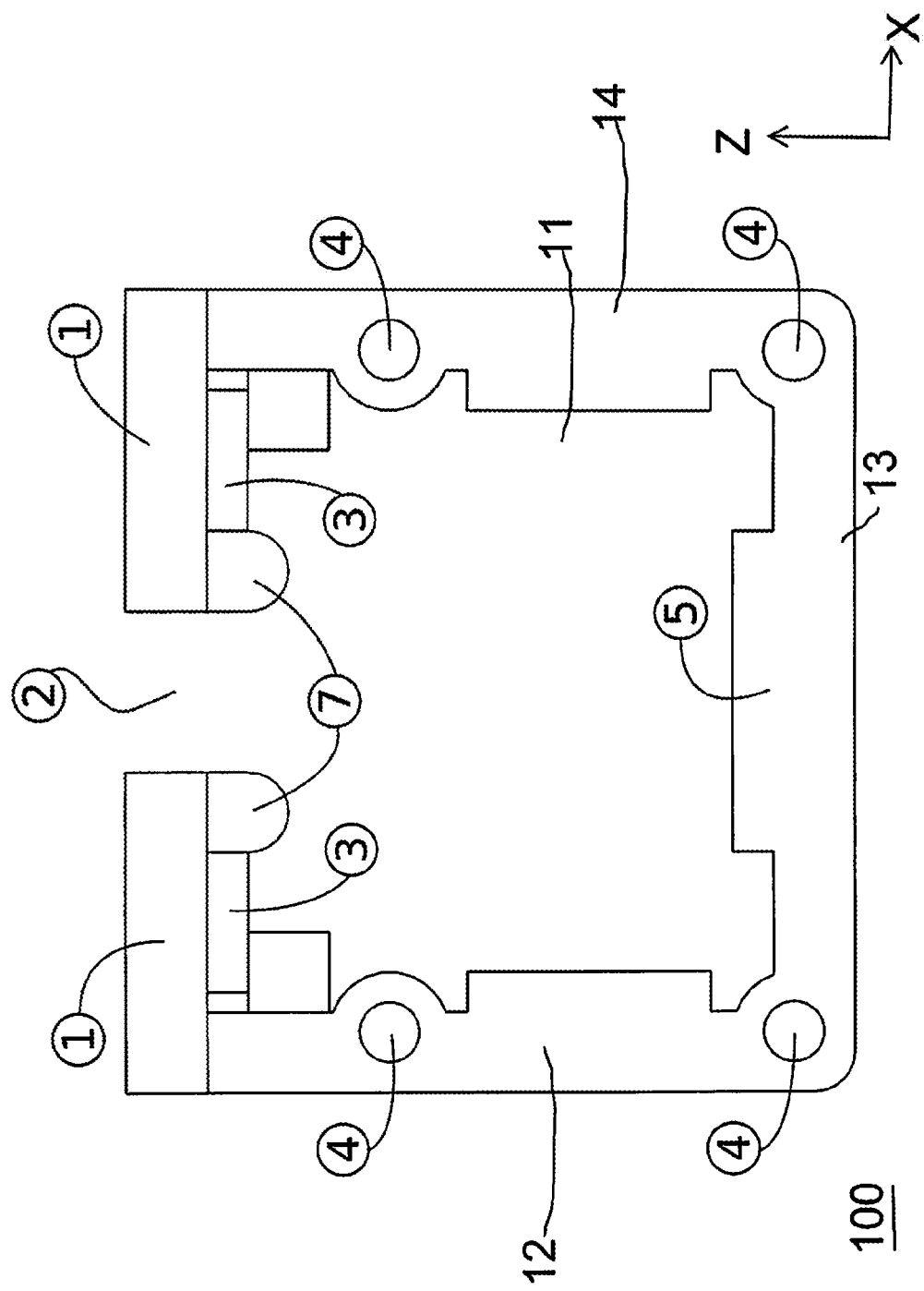
FIG. 7 is a cross-sectional side view of the illustrative in-road electric conductivity box of FIGS. 1, 2, 3, 4, 5, and 6, taken from line VII-VII of FIG. 3, in accordance with some embodiments.
Figure 7A:
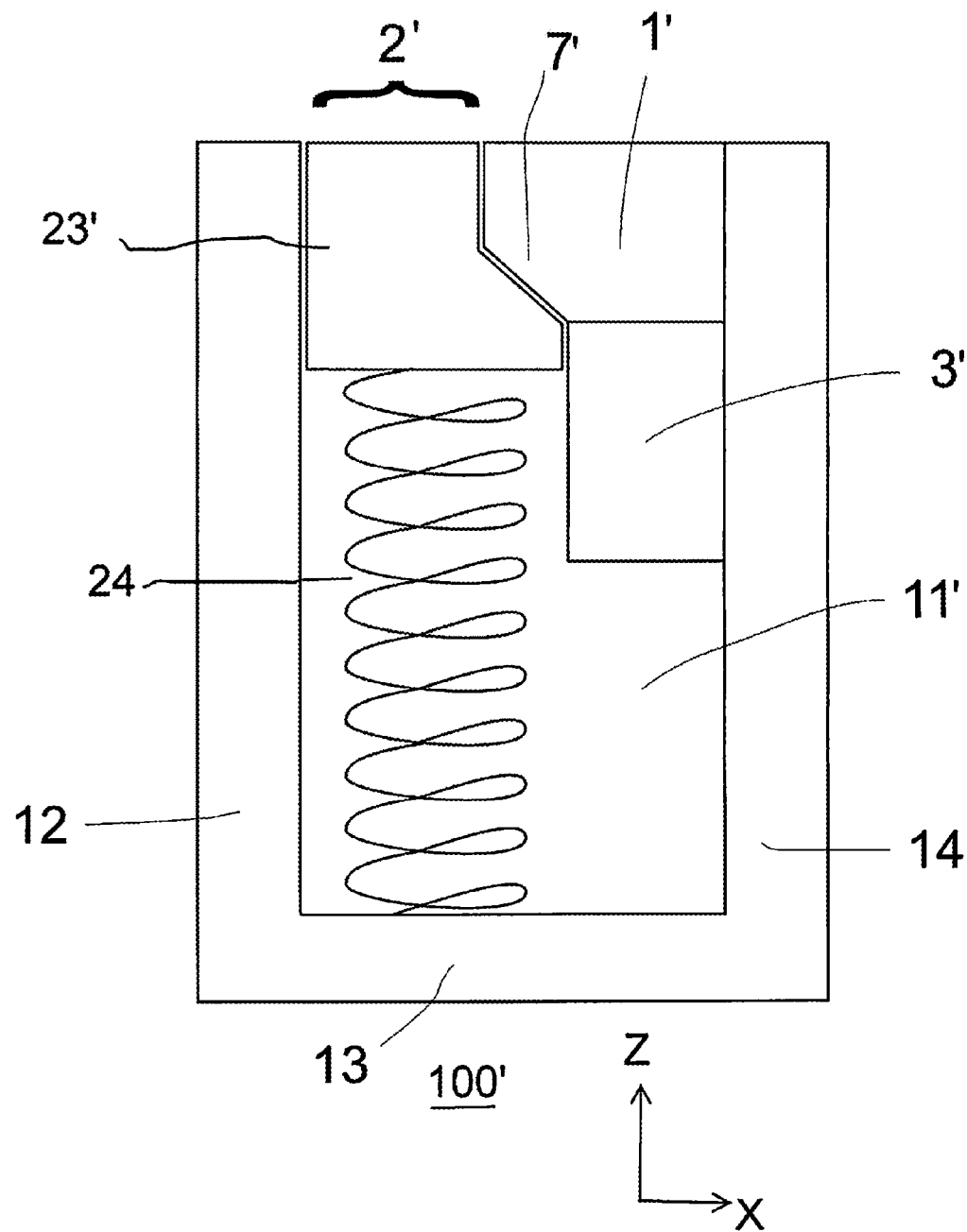
FIG. 7A is a cross-sectional side view of the illustrative in-road electric conductivity box of FIGS. 1A, 2A, 3A, and 5A, taken from line VIIA-VIIA of FIG. 3A, in accordance with some embodiments.

Access to an electrical element 3' in a box 100' may be accomplished through opening 2'. Such opening 2' may be any suitable size width (e.g., in the X-axis of FIG. 3A), such as in the range of a ¼ inch to 6 inches. The sides of a lip 7' of opening 2' may be straight or angled (see, e.g., FIG. 7A). Such an opening 2' may be closed to prevent rain, snow, and/or other debris from entering cavity 11' of a box 100', such as via a flap or other opening mechanism 23' (see, e.g., FIGS. 5A and 7A) that may be affixed to or nested in cavity 11' that may open to allow a probe 310 of an overpassing vehicle 300 to access cavity 11', but that may close when such access is no longer needed. Opening 2' may also be closed with an internal surface blocking mechanism 23' within box 100' that may recede, open, or descend into cavity 11' in any way to allow a probe 310 of an overpassing vehicle 300 to access element 3' through opening 2'. Such a mechanism 23' may be composed of rubber or any other suitable material. The ascent/descent of mechanism 23' and/or probe 310 may be controlled by a spring, and/or an electronic or other ascent/descent compression system, which may either be passive or active. For example, as shown in FIG. 7A, a spring 24 may be provided that may be coupled to mechanism 23' and potentially to another component of box 100', where spring 24 may be configured to compress in order to remove mechanism 23' at least partially from opening 2' (e.g., in a downward direction of axis Z) to at least partially increase the size of opening 2' through which cavity 11' may be accessed, and/or where spring 24 may be configured to decompress in order to further insert mechanism 23' at least partially into opening 2' (e.g., in an upward direction of axis Z) to at least partially reduce the size of opening 2' through which cavity 11' may be accessed. In some embodiments, box 100' may not include a top 1', but instead opening 2' may be defined between left wall 12 and right wall 14, where contact 3' may be coupled to one or both of walls 12/14 and/or where mechanism 23' may be configured to interact with opening 2' as described above. In some embodiments, a portion of probe 310, such as a contact 3' or portion of bar 312', may contact and physically move mechanism 23' to a new position that enables passage of that portion of probe 310 through opening 2' (e.g., probe 310 may physically contact and move mechanism 23' in such a way that spring 24 may compress as described above).

To achieve electrical transmission between a box 100' and vehicle 300, an on-vehicle descent and pivot contact probe 310 may be provided on vehicle 310 that may descend through opening 2', into cavity 11', and then electrically couple with one or more elements 3' of box 100'. A manual or automated on-vehicle system (e.g., a portion of component 320) may identify the location of a box 100' and/or its opening 2' along road 400 and may maintain tracking of elements 3' within boxes 100'. Tracking of such elements 3' within boxes 100' may be facilitated by in-vehicle sensors of component 320 and/or component 20 of one or more boxes 100' may monitor driver input and/or vehicle movement that may feed into the contact control system of component 320 and/or component 20. When a gap closure mechanism 23' may be used, opening 2' may be opened via an automated opening mechanism (e.g., automated control of spring 24 or another suitable component with a similar function) or downward pressure from vehicle 300 (e.g., probe 310) onto the receding gap-closing surface of mechanism 23' or by other means of providing the clearance to opening 2' to allow the on-vehicle descent and pivot contact 313 to descend into box 100'. Probe 310 may be configured to enable a pivot or any other suitable mechanized movement of electrical contacts 313', such as carbon brushes, to move into contact with conductors 3' in cavities 11' of parallel boxes 100'. Such contacts 313' may be withdrawn rapidly from cavities 11' under various circumstances (e.g., as may be detected by component 20 and/or 320), such as driver option, lane change, imminent crash detection, road flooding, excessive electrical demand on conducting wires, on-vehicle electric problems, and/or other adverse events. Power drawn by an overpassing vehicle 300 may be monitored and/or controlled by a control system within vehicle 300 (e.g., component 320) and/or by one or more components 20 of boxes 100' of system 1000'. In some embodiments, higher power may not be drawn by vehicle 300 until some initial sensing, communicating, or other "handshaking" between vehicle 300 and one or more boxes 100' may determine that electrical contact has been established. Such a power draw may also be reduced prior to withdrawal of probe 310 and/or if adverse conditions were detected by component 20 and/or component 320. A low power draw state may allow for arc suppression as electrical communication is being made/interrupted between contacts 3' and 313'.

Figure 9:
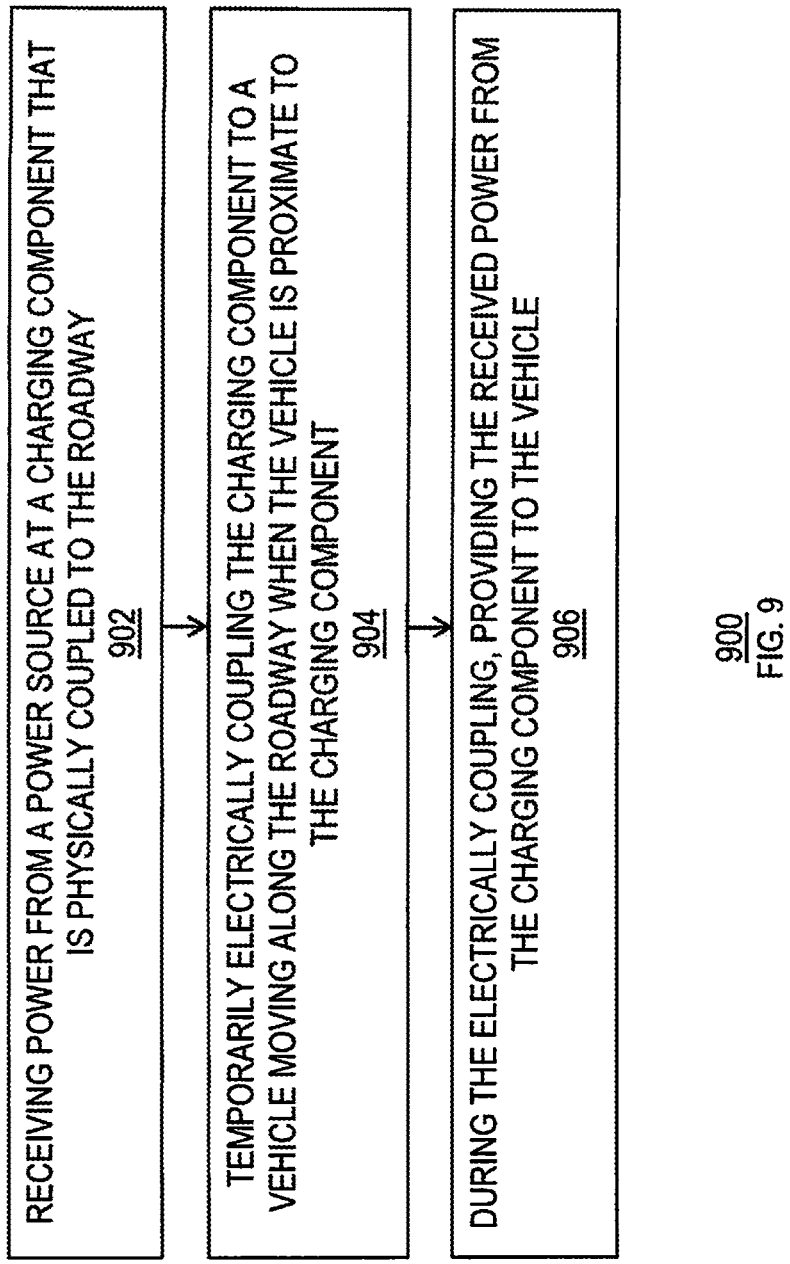
FIG. 9 is a flowchart of an illustrative process for providing power to a vehicle, in accordance with some embodiments.

FIG. 9 is a flowchart of an illustrative process 900. At step 902, process 900 may include receiving power from a power source at a charging component that is physically coupled to a roadway. For example, as described above with respect to system 1000, box 100 may be physically coupled to road 400 and may receive power from power source 200. Next, at step 904, process 900 may include temporarily electrically coupling the charging component to a vehicle moving along the roadway when the vehicle is proximate to the charging component. For example, as described above with respect to system 1000, probe 310 may electrically couple contact 3 of box 100 with vehicle electronic component 320 of vehicle 300 when vehicle 300 is proximate box 100 during the travel of vehicle 300 along road 400. Moreover, at step 906, during the coupling of step 904, process 900 may include providing the received power of step 902 from the charging component to the vehicle. For example, as described above with respect to system 1000, probe 310 may provide power from box 100 to vehicle electronic component 320 (e.g., for propelling vehicle 300 further along road 400 past that box 100).

It is understood that the steps shown in process 900 of FIG. 9 are merely illustrative and that existing steps may be modified or omitted, additional steps may be added, and the order of certain steps may be altered.

While there have been described systems and methods for providing in-road electric conductivity boxes and on-vehicle descent and pivot contacts for vehicles, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A vehicle for use with a system component physically connected to a road at a first location, the vehicle comprising:
   a main body comprising a bottom surface;
   at least one wheel coupled to the main body for moving the vehicle along the road;
   an electronic vehicle component at least partially positioned within the main body; and
   a probe electrically coupled to the electronic vehicle component, wherein the probe electrically couples the electronic vehicle component to the system component when the vehicle moves along the road proximate the first location, wherein a first portion of the probe is positioned lower than a top surface of the road when the probe electrically couples the electronic vehicle component to the system component, and wherein a second portion of the probe is positioned lower than the bottom surface of the main body but higher than the top surface of the road when the probe electrically couples the electronic vehicle component to the system component.

2. The vehicle of claim 1, wherein a portion of the first portion of the probe physically couples the electronic vehicle component to the system component when the probe electrically couples the electronic vehicle component to the system component.

3. The vehicle of claim 1, wherein the electronic vehicle component:
   receives power from the system component when the probe electrically couples the electronic vehicle component to the system component; and
   uses the received power to propel the at least one wheel for moving the vehicle along the road.

4. A vehicle for use with a system component physically connected to a road at a first location, the vehicle comprising:
   a main body comprising a bottom surface;
   at least one wheel coupled to the main body for moving the vehicle along the road;
   an electronic vehicle component at least partially positioned within the main body; and
   a probe electrically coupled to the electronic vehicle component, wherein the probe electrically couples the electronic vehicle component to the system component when the vehicle moves along the road proximate the first location, wherein a portion of the probe rotates from a first position operative to pass a contact of the probe through an opening in the system component to a second position operative to align the contact of the probe with a contact of the system component.

\* \* \* \* \*